(12) United States Patent
Andrus et al.

(10) Patent No.: US 11,734,407 B2
(45) Date of Patent: *Aug. 22, 2023

(54) SENSOR DERIVED AUTHENTICATION FOR ESTABLISHING PEER-TO-PEER NETWORKS

(71) Applicant: Apple Inc., Cupertino, CA (US)

(72) Inventors: David C. Andrus, Morgan Hill, CA (US); Philip F. Kearney, San Jose, CA (US); Christopher B. Zimmermann, San Jose, CA (US); Jeremy C. Franklin, San Francisco, CA (US); Nathaniel S. Sharpe, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,465

(22) Filed: Jun. 10, 2022

(65) Prior Publication Data

US 2022/0386113 A1 Dec. 1, 2022

Related U.S. Application Data

(63) Continuation of application No. 16/889,744, filed on Jun. 1, 2020, now Pat. No. 11,372,962, which is a
(Continued)

(51) Int. Cl.
*G06F 21/00* (2013.01)
*G06F 21/36* (2013.01)
(Continued)

(52) U.S. Cl.
CPC ............ *G06F 21/36* (2013.01); *G06F 3/017* (2013.01); *H04L 9/0844* (2013.01);
(Continued)

(58) Field of Classification Search
CPC ....... G06F 21/36; H04L 9/0844; H04L 63/08; H04L 9/0838; H04L 9/0861;
(Continued)

(56) References Cited

U.S. PATENT DOCUMENTS 7,333,611 B1 2/2008 Yuen et al.
7,427,926 B2 * 9/2008 Sinclair ............ H04M 1/72412
340/681

(Continued)

FOREIGN PATENT DOCUMENTS

WO 2009105115 A2 8/2009

OTHER PUBLICATIONS

Bump Technologies, Inc., "bump Technologies: Our team," http://bu.mp/ourteam.html, retrieved on Jan. 6, 2010, 2 pages.
(Continued)

*Primary Examiner* — Kendall Dolly
(74) *Attorney, Agent, or Firm* — Dickinson Wright RLLP

(57) ABSTRACT

Methods, systems and devices for generating an authentication key are provided. Two or more communications devices can generate an authentication key by monitoring a physical stimulus that is experienced by both devices (e.g., a common physical stimulus). Each device can then use an identical, predetermined algorithm to generate a common authentication key based on the stimulus. The devices can use the common authentication key to establish a secure network.

20 Claims, 15 Drawing Sheets

Related U.S. Application Data continuation of application No. 16/149,021, filed on Oct. 1, 2018, now Pat. No. 10,678,904, which is a continuation of application No. 15/585,088, filed on May 2, 2017, now Pat. No. 10,089,456, which is a continuation of application No. 14/472,276, filed on Aug. 28, 2014, now Pat. No. 9,659,162, which is a continuation of application No. 12/364,142, filed on Feb. 2, 2009, now Pat. No. 8,837,716.

(51) Int. Cl.

| | | |
|---|---|---|
| *H04W 12/50* | (2021.01) | |
| *H04W 76/14* | (2018.01) | |
| *H04W 12/037* | (2021.01) | |
| *G06F 3/01* | (2006.01) | |
| *H04L 9/08* | (2006.01) | |
| *H04L 9/40* | (2022.01) | |
| *H04W 12/04* | (2021.01) | |
| H04L 9/32 | (2006.01) | |
| H04W 84/18 | (2009.01) | |
| H04W 12/65 | (2021.01) | |
| H04W 12/68 | (2021.01) | |

(52) U.S. Cl.
CPC ............ *H04L 9/0866* (2013.01); *H04L 63/08* (2013.01); *H04W 12/037* (2021.01); *H04W 12/04* (2013.01); *H04W 12/50* (2021.01); *H04W 76/14* (2018.02); H04L 9/0838 (2013.01); H04L 9/0861 (2013.01); H04L 9/3297 (2013.01); H04L 2209/805 (2013.01); H04L 2463/061 (2013.01); H04W 12/65 (2021.01); H04W 12/68 (2021.01); H04W 84/18 (2013.01)

(58) Field of Classification Search
CPC ............. H04L 9/3297; H04L 2209/805; H04L 2463/061; H04W 12/04; H04W 12/50; H04W 12/65; H04W 12/68; H04W 84/18
See application file for complete search history.

(56) References Cited

U.S. PATENT DOCUMENTS

| | | | |
|---|---|---|---|
| 7,802,099 B2 | 9/2010 | Mitchell et al. | |
| 7,907,901 B1 | 3/2011 | Kahn et al. | |
| 7,933,408 B2 | 4/2011 | Wong et al. | |
| 8,458,363 B2 * | 6/2013 | Rosenblatt | F01N 3/103 |
| | | | 709/248 |
| 8,837,716 B2 | 9/2014 | Andrus et al. | |
| 9,659,162 B2 | 5/2017 | Andrus et al. | |
| 10,089,456 B2 | 10/2018 | Andrus et al. | |
| 2002/0146127 A1 | 10/2002 | Wong | |
| 2002/0146129 A1 | 10/2002 | Kaplan | |
| 2003/0133576 A1 | 7/2003 | Grumiaux | |
| 2003/0172271 A1 | 9/2003 | Silvester | |
| 2004/0111601 A1 | 6/2004 | Racz | |
| 2004/0162983 A1 | 8/2004 | Gotoh et al. | |
| 2006/0198448 A1 * | 9/2006 | Aissi | H04W 88/02 |
| | | | 375/259 |
| 2006/0210083 A1 | 9/2006 | Takemoto et al. | |
| 2006/0256070 A1 * | 11/2006 | Moosavi | H04M 1/72412 |
| | | | 345/104 |
| 2006/0256074 A1 | 11/2006 | Krum et al. | |
| 2007/0003061 A1 | 1/2007 | Jung et al. | |
| 2007/0123166 A1 | 5/2007 | Sheynman et al. | |
| 2007/0143612 A1 | 6/2007 | Brown et al. | |
| 2007/0188323 A1 | 8/2007 | Sinclair et al. | |
| 2007/0233615 A1 | 10/2007 | Tumminaro | |
| 2008/0019514 A1 | 1/2008 | Stromberg et al. | |
| 2008/0195735 A1 | 8/2008 | Hodges et al. | |
| 2009/0153342 A1 | 6/2009 | Thorn | |
| 2009/0156202 A1 | 6/2009 | Reiss et al. | |
| 2009/0276547 A1 | 11/2009 | Rosenblatt et al. | |
| 2009/0300549 A1 | 12/2009 | Wang et al. | |
| 2010/0167646 A1 | 7/2010 | Alameh et al. | |
| 2010/0199092 A1 | 8/2010 | Andrus et al. | |
| 2010/0223461 A1 | 9/2010 | Drader et al. | |
| 2010/0278342 A1 | 11/2010 | Pering et al. | |
| 2011/0117841 A1 | 5/2011 | Thorn et al. | |
| 2011/0314153 A1 | 12/2011 | Bathiche et al. | |
| 2013/0010956 A1 | 1/2013 | Bichler et al. | |
| 2014/0226813 A1 | 8/2014 | Heffner | |
| 2015/0046991 A1 | 2/2015 | Andrus et al. | |
| 2017/0337367 A1 | 11/2017 | Andrus et al. | |
| 2019/0163895 A1 | 5/2019 | Andrus et al. | |

OTHER PUBLICATIONS

David Lieb, "The Idea for Bump," Bump Technologies Blog, Mar. 29, 2009, http://bumptechnologies.wordpress.com/2009/03/29/the-idea-for-bump/, retrieved on Jan. 6, 2010, 3 pages.

Eric Benderoff, "New iPhone app works by bump, not touch," Chicago Tribune, Mar. 30, 2009, http://featuresblogs.chicagotribune.com/eric2_0/2009/03/new-iphone-app-works-by-bump-not-touch, retrieved on Jan. 6, 2010, 4 pages.

Johnson, Joel, "Tapulous shows iPhone Apps: Friend Book, Tap Tap Revenge, and Twinkle," Jul. 9, 2008, http://gadgets/boingboing.neU2008/07/09/tapulous-shows-iphon.html, retrieved on Oct. 21, 2008., 5 pages.

"Important Friend Book and handshake announcement," http://getsatisfaction.com/tapulous/topics/important_friend_book_and_handshake_announcement.html, retrieved on Oct. 21, 2008, 4 pages.

* cited by examiner

SENSOR DERIVED AUTHENTICATION FOR ESTABLISHING PEER-TO-PEER NETWORKS

CROSS-REFERENCE TO RELATED APPLICATIONS

This application is a continuation of U.S. application Ser. No. 16/889,744, filed Jun. 1, 2020, entitled "SENSOR DERIVED AUTHENTICATION FOR ESTABLISHING PEER-TO-PEER NETWORKS," set to issue Jun. 28, 2022 as U.S. Pat. No. 11,372,962, which is a continuation of U.S. application Ser. No. 16/149,021, filed Oct. 1, 2018, entitled "SENSOR DERIVED AUTHENTICATION FOR ESTABLISHING PEER-TO-PEER NETWORKS," issued Jun. 9, 2020 as U.S. Pat. No. 10,678,904, which is a continuation of U.S. application Ser. No. 15/585,088 filed May 2, 2017, entitled "SENSOR DERIVED AUTHENTICATION FOR ESTABLISHING PEER-TO-PEER NETWORKS," issued Oct. 2, 2018 as U.S. Pat. No. 10,089,456, which is a continuation of U.S. application Ser. No. 14/472,276 filed Aug. 28, 2014, entitled "SENSOR DERIVED AUTHENTICATION FOR ESTABLISHING PEER-TO-PEER NETWORKS," now U.S. Pat. No. 9,659,162 issued May 23, 2017, which is a continuation of U.S. application Ser. No. 12/364,142 filed Feb. 2, 2009, entitled "SENSOR DERIVED AUTHENTICATION FOR ESTABLISHING PEER-TO-PEER NETWORKS," now U.S. Pat. No. 8,837,716 issued Sep. 16, 2014, the contents of which are incorporated herein by reference in their entirety for all purposes.

FIELD

This is directed to communications methods, devices, and systems for generating authentication keys.

BACKGROUND

Most communications protocols require that each device in a wireless network uses a common authentication key, such as a personal identification number (PIN), to secure communications. However, the traditional techniques for implementing such an authentication process can be tedious and slow. For example, the users may need to agree upon a common PIN (or share a predetermined PIN) and then manually enter the PIN into each device. These steps can slow down the process of forming secured networks and may even discourage users from using secured networks.

SUMMARY

This is directed to communications methods, devices, and systems for generating authentication keys based on one or more physical stimuli.

In some embodiments, two or more communications devices can generate an authentication key by monitoring a physical stimulus that is experienced by both devices (e.g., a common physical stimulus). For example, each device can include a sensor and monitor the sensor output during a common physical stimulus. After monitoring a common physical stimulus, each device can then use an identical, predetermined algorithm to generate a common authentication key based on sensor output associated with the stimulus. The devices can use the common authentication key to establish a secure network.

In some embodiments, two or more devices can generate an authentication key by detecting first and second physical stimuli. Each device can generate an authentication key based on the time elapsed between the two stimuli. For example, a user can tap the devices together twice, and then each device can use the time between the taps to generate an authentication key for establishing a secure network between the two devices. Each device may also include wireless circuitry that can use the authentication key to establish a secure network with other devices. In some embodiments, one device can include an exciter and another device can include a sensor, and the exciter can provide a physical stimulus for the sensor to detect. Accordingly, a user may not need to provide a physical stimulus when using such a system to generate an authentication key.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to communications methods, devices, and systems for generating authentication keys based on one or more physical stimuli.

Each device in a communications network can detect a common physical stimulus (e.g., a stimulus that affects both devices) and then generate an authentication key based on the common stimulus. Each device's authentication key may have the same value because each key may be based on the same stimulus. For example, each device can use its own sensor to detect a common physical stimulus and, given that the stimulus affects both devices, each device can generate an authentication key with the same value based on the output of its sensor. To obtain matching authentication keys based on a common physical stimulus, each device may use an identical, predetermined algorithm to generate its key. The algorithm can be determinative so that the same sensor output will always result in the same authentication key. In this manner, the devices can, based on a common physical stimulus, automatically generate authentication keys having the same value and establish a secure network.

As used herein, the term "secure network" refers to any secure network and may, but does not necessarily, include networks protected by encryption or other security measures.

Figure 1:
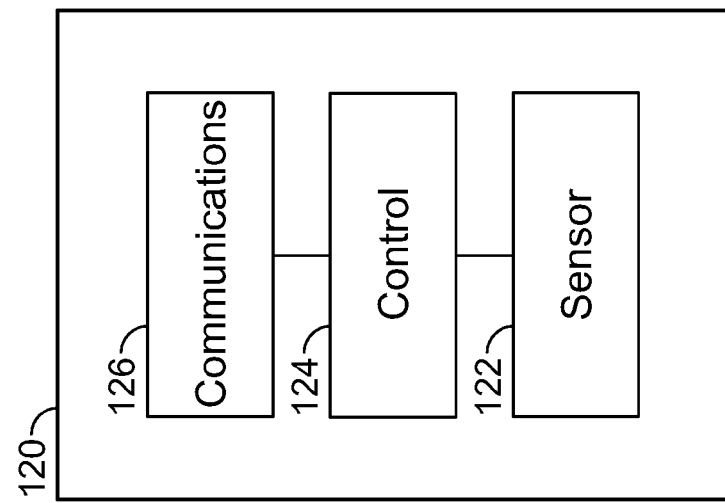
FIG. 1 is a schematic view of a communications system in accordance with one embodiment of the invention.
Figure 1:
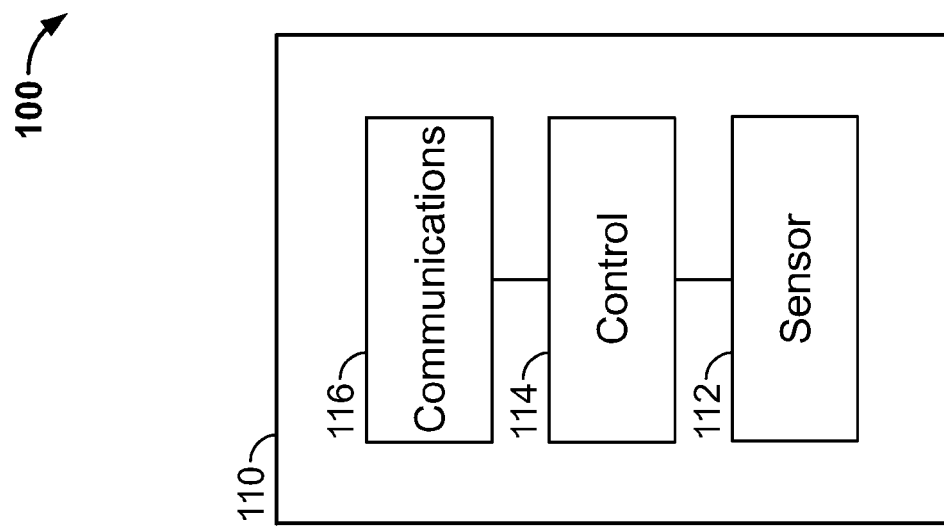

FIG. 1 can include communications system 100 in accordance with one embodiment of the invention. System 100 can include first communications device 110 and second communications device 120. First communications device 110 and second communications device 120 may each be any suitable device for sending and receiving wireless communications. For example, first communications device 110 and second communications device 120 may each include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a cyclocomputer, a music recorder, a video recorder, a camera, radios, medical equipment, domestic appliances, movable transportation vehicle instruments, calculators, and any other portable electronic device capable of communicating wirelessly (with or without the aid of a wireless enabling accessory system).

First communications device 110 can include sensor 112, control circuitry 114, and wireless communications circuitry 116. Control circuitry 114 can be electrically coupled with sensor 112 and wireless communications circuitry 116.

Control circuitry 114 can include any processing circuitry or processor operative to control the operations and performance of first communications device 110. For example, control circuitry 114 can be used to run operating system applications, firmware applications, media playback applications, media editing applications, or any other application. In some embodiments, control circuitry 114 can perform one or more mathematical functions to generate an authentication key. In some embodiments, the control circuitry can drive a display and process inputs received from a user interface. Control circuitry 114 may include, for example, a processor, a bus (e.g., for sending instructions to the other components of first communications device 110), memory, storage, or any other suitable component for controlling the operations of first communications device 110.

Sensor 112 can include any suitable sensor for detecting a physical stimulus. For example, sensor 112 can include a sensor for detecting a thermal stimulus, an electromagnetic stimulus, a mechanical stimulus, a chemical stimulus, an optical stimulus, an acoustic stimulus, any other suitable physical stimulus, or a combination of physical stimuli. In some embodiments, sensor 112 can include several sensors for detecting a single type of physical stimulus or different types of physical stimuli in combination.

In accordance with one embodiment, sensor 112 may include a motion sensing component for detecting the movement of first communications device 110. For example, a motion sensing component can include one or more three-axes acceleration motion sensing components (e.g., an accelerometer) operative to detect linear acceleration in three directions (i.e., the x or left/right direction, the y or up/down direction, and the z or forward/backward direction). As another example, a motion sensing component can include one or more two-axis acceleration motion sensing components which can be operative to detect linear acceleration only along each of x or left/right and y or up/down directions (or any other pair of directions). In some embodiments, a motion sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, sensor 112 can include a motion sensing component that can directly detect rotation, rotational movement, angular displacement, tilt, position, orientation, motion along a non-linear (e.g., arcuate) path, or any other non-linear motions. For example, if the motion sensing component is a linear motion sensing component, additional processing can be used to indirectly detect some or all of the non-linear motions. For example, by comparing the linear output of the motion sensing component with a gravity vector (i.e., a static acceleration), the motion sensing component can calculate the tilt of first communications device 110 with respect to the y-axis. In some embodiments, the motion sensing component can, instead or in addition, include one or more gyro-motion sensing components or gyroscopes for detecting rotational movement. For example, sensor 112 can include a rotating or vibrating element. As another example, sensor 112 can include a magnometer operative to detect the orientation of the device relative to a magnetic north pole. The device can monitor changes in the output of the magnometer to detect rotations of the device.

In accordance with another embodiment, sensor 112 may include one or more environmental sensing components for detecting other physical stimuli affecting first communications device 110. Suitable environmental sensing components may include, for example, proximity sensors, thermal sensors, optical sensors, infra-red sensors, light sensors, pressure sensors, acoustic sensors, any other suitable type of sensor, or any combination thereof.

When detecting a physical stimulus, sensor 112 may provide one or more electrical signals to control circuitry 114 based on the stimulus. For example, sensor 112 may provide one or more sensor output signals with a voltage or current that varies based on the detected physical stimulus. In some embodiments, sensor 112 may measure movement along multiple axes and provide multiple output signals, each signal representing the movement of first communications device 110 along a different axis.

Communications circuitry 116 can include any suitable communications circuitry operative to connect to a communications network and to transmit communications (e.g., voice or data) from first communications device 110 to other devices within the communications network (e.g., second communications device 120). Communications circuitry 116 can be operative to interface with the communications network using any suitable communications protocol such as, for example, Wi Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 116 can be operative to provide wired communications paths for first communications device 110.

First communications device 110 can include one more instances of communications circuitry 116 for simultaneously performing several communications operations using different communications networks, although only one is shown in FIG. 1 to avoid overcomplicating the drawing. For example, first communications device 110 can include a first instance of communications circuitry 116 for communicating over a cellular network, and a second instance of communications circuitry 116 for communicating over Wi-Fi or using Bluetooth®). In some embodiments, the same instance of communications circuitry 116 can be operative to provide for communications over several communications networks.

It is understood that the schematic shown in FIG. 1 is simplified for the purposes of illustration, and that other components can be included in first communications device 110 and/or second communications device 120. For example, first communications device 110 may include one or more I/O circuitries, memory, storage media, audio outputs, displays, input mechanisms, microphones, positioning circuitries, any other suitable components, and/or any combinations thereof (e.g., as typically found in a device such as first communications device 110).

First communications device 110 and second communications device 120 can be substantially similar. Accordingly, the previous description of first communications device 110, sensor 112, control circuitry 114, and communications circuitry 116 can be applied, respectively, to second communications device 120, sensor 122, control circuitry 124, and communications circuitry 126. In some embodiments, first communications device 110 and second communications device 120 can be so similar that the two devices can be interchanged and still generate authentication keys to form a secure network.

Figure 2:
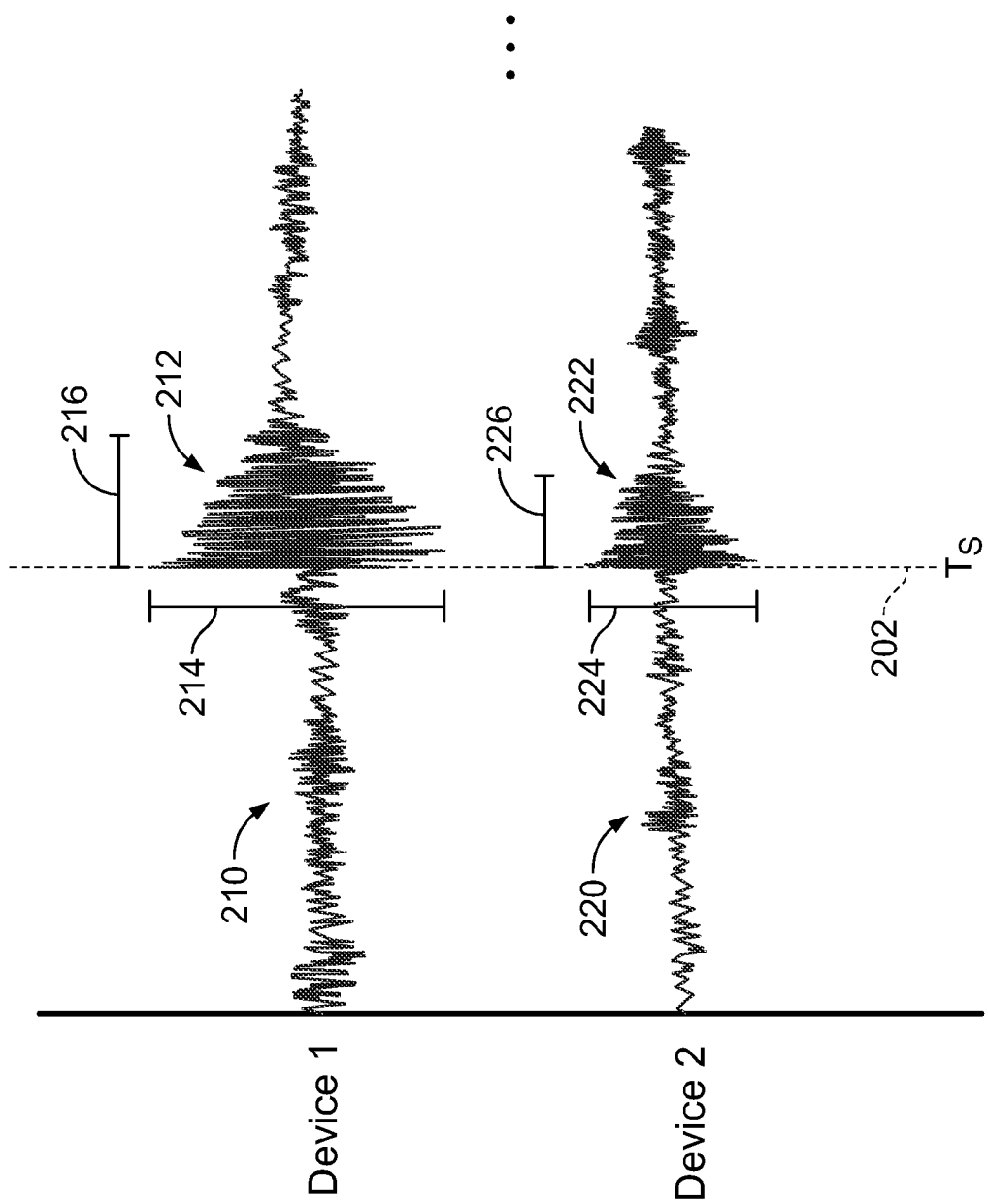
FIG. 2 is a timing diagram of sensor outputs in accordance with one embodiment of the invention.

Each device (e.g., first communications device 110 and second communications device 120) can detect and represent one or more physical stimuli using any suitable approach. In some embodiments, a device can generate a plot of sensor output (e.g., the output of sensor 112) over time. FIG. 2 is a timing diagram of sensor outputs in accordance with one embodiment of the invention. Sensor output 210 is an exemplary waveform that can be generated by a sensor in a first communications device (e.g., sensor 112 in first communications device 110), and sensor output 220 is an exemplary waveform that can be generated by a sensor in a second communications device (e.g., sensor 122 in second communications device 120). The waveforms of output 210 and output 220 can represent amplitude modulations, frequency modulations, or any other suitable modulations that a sensor may generate to represent a physical stimulus. In some embodiments, an aggregate of multiple sensor outputs can be used to represent a physical stimulus. In such embodiments, output 210 and output 220 can represent an aggregate of multiple sensor outputs. For example, a sensor may include an accelerometer that measures movement along multiple axes and generates a separate output for each axis, and output 210 or output 220 may represent a combination of the accelerometer's outputs that reflects the device's total movement.

Each output shown in FIG. 2 can include an excitation that corresponds to a physical stimulus experienced by both devices (e.g., a common physical stimulus). For example, both devices can experience a common physical stimulus at time Ts 202 causing excitation 212 in output 210 and excitation 222 in output 220. Each device can analyze an excitation in a sensor output to identify at least one characteristic value of the excitation. For example, each device may include control circuitry (e.g., control circuitry 114 or control circuitry 124) that can analyze an excitation in a sensor output (e.g., an output from sensor 112 or an output from sensor 122) to identify at least one characteristic value. The characteristic value can be based on any suitable characteristic of the excitation that may be similar for all devices experiencing the stimulus. For example, the characteristic value can be based on the duration of the excitation, the magnitude of the excitation, the frequency composition of the excitation, the time at which the excitation occurs, any other suitable property of the excitation or any combination thereof.

In some embodiments, a characteristic value may be based on a temporal property of an excitation. A communications device (e.g., first communications device 110 or second communications device 120) may have highly accurate time information (e.g., information from a crystal oscillator, information from a Global Positioning System, or information from a network server) that can be used to measure a characteristic value based on one or more temporal properties of an excitation. For example, a characteristic value of an excitation may be based on the time that the excitation begins. As shown in FIG. 2, time Ts 202 may correspond to when an excitation begins. A communications device can determine when an excitation begins by monitoring, for example, when the magnitude of the sensor output exceeds a threshold or when the slope of a sensor output exceeds a threshold. When the communications device determines that an excitation has begun, the device can capture the precise time (e.g., from a Global Positioning System or a network server) and use that time as a characteristic value.

In some embodiments, a characteristic value may be based on the duration of an excitation. As shown in FIG. 2, duration 216 may correspond to the duration of excitation 212, and duration 226 may correspond to the duration of excitation 222. The duration of an excitation may be calculated as the time elapsed from the beginning of the excitation (e.g., Ts 202) until the sensor's output falls below a predetermined threshold. In some embodiments, the duration of an excitation may be calculated as the time elapsed from the beginning of the excitation until the sensor's output falls below a predetermined percentage of the maximum peak of the excitation (e.g., peak magnitude 214 or peak magnitude 224). The duration of each excitation may be affected by various factors such as the duration of the physical stimulus, the intensity of the stimulus, the orientation of each device's sensor relative to the stimulus, or the proximity of each device's sensor to the stimulus. Accordingly, using characteristic values based on excitation duration may be most useful in embodiments where the devices are equally affected by the stimulus. For example, using characteristic values based on excitation duration may be useful in embodiments where devices are coupled together or held together by a user and experience a common movement.

In some embodiments, a characteristic value may be based on a nontemporal property of an excitation. For example, a characteristic value may be based on the peak magnitude of an excitation. As shown in FIG. 2, peak magnitude 214 may correspond to the maximum magnitude of output 210 during excitation 212, and peak magnitude 224 may correspond to the maximum magnitude of output

220 during excitation 222. The peak magnitude of an excitation may be affected by various factors such as the intensity of the stimulus, the orientation of each device's sensor relative to the stimulus, or the proximity of the device's sensor to the stimulus. Accordingly, using characteristic values based on excitation peak magnitude may be most useful in embodiments where the devices are equally affected by a physical stimulus. For example, using characteristic values based on excitation peak magnitude may be useful in embodiments where devices are coupled together or held together by a user and experience a common movement.

In some embodiments, several physical stimuli can be provided so that a sensor output can include multiple excitations and a characteristic value may be based on a property of the excitations. For example, a characteristic value may be based on the average value of a property across all of the excitations. In another example, a characteristic value may be based on a property of the set of excitations (e.g., the total duration of the set of excitations or the frequency composition of the set of excitations).

Figure 3:
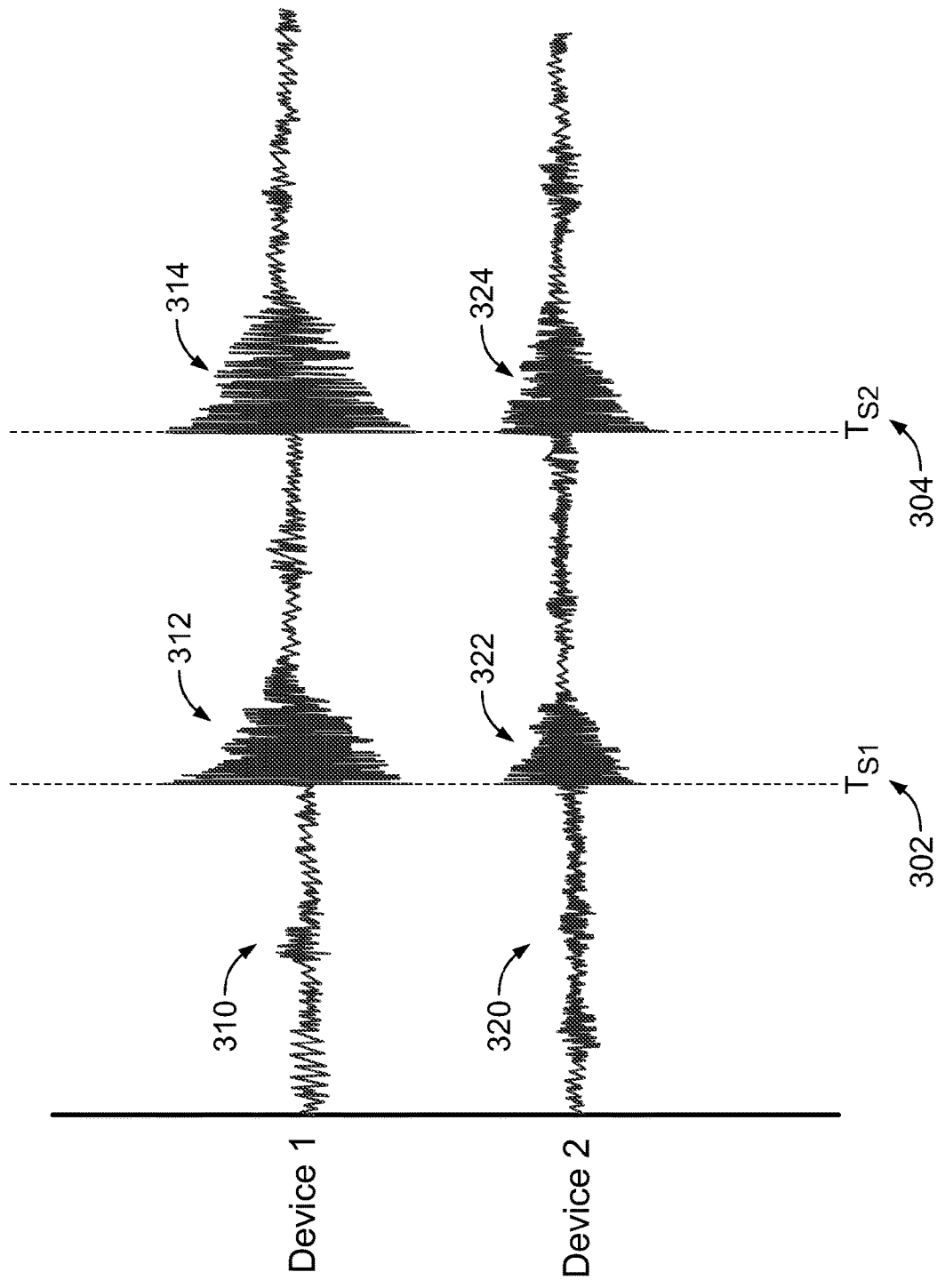
FIG. 3 is a timing diagram of sensor outputs in accordance with one embodiment of the invention.

FIG. 3 is a timing diagram of sensor outputs in accordance with one embodiment of the invention. Sensor output 310 is an exemplary waveform that can be generated by a sensor in a first communications device (e.g., sensor 112 in first communications device 110), and sensor output 320 is an exemplary waveform that can be generated by a sensor in a second communications device (e.g., sensor 122 in second communications device 120). The waveforms of output 310 and output 320 can represent amplitude modulations, frequency modulations, or any other suitable modulations that a sensor may generate to represent physical stimuli. In some embodiments, an aggregate of multiple sensor outputs can be used to represent a physical stimulus. In such embodiments, output 310 and output 320 can represent an aggregate of multiple sensor outputs. For example, a sensor may include an accelerometer that measures movement along multiple axes and generates a separate output for each axis, and output 310 or output 320 may represent a combination of the accelerometer's outputs that reflects the device's total movement.

Each output shown in FIG. 3 can include two excitations that correspond to physical stimuli experienced by both devices (e.g., two common physical stimuli). For example, both devices can experience a first common physical stimulus at time Ts1 302 causing excitation 312 in output 310 and excitation 322 in output 320. After the first stimulus, both devices can experience a second common physical stimulus at time Ts2 304 causing excitation 314 in output 310 and excitation 324 in output 320.

Each device can analyze multiple excitations in a sensor output to identify at least one characteristic value of the excitations. For example, each device may include control circuitry (e.g., control circuitry 114 or control circuitry 124) that can analyze excitations in a sensor output (e.g., an output from sensor 112 or an output from sensor 122) to identify at least one characteristic value. The characteristic value can be based on any suitable characteristic of the excitations that may be similar for all devices experiencing the stimuli. For example, the characteristic value can be based on the time elapsed between two excitations, the average excitation duration of a set of excitations, the frequency composition of a set of excitations, the average magnitude of a set of excitation, any other suitable property of the set of excitations or any combination thereof. In some embodiments, a characteristic value can be based on a nontemporal property of a set of excitations. For example, a characteristic value can be based on the average excitation peak magnitude of the excitations in the set.

In some embodiments, a characteristic value can be based on a temporal property of a set of excitations. For example, a characteristic value can be based on the time elapsed between a first excitation and a second excitation. Referring to FIG. 3, a characteristic value can be based on the time elapsed between time Ts1 302 when a first excitation occurs and time Ts2 304 when a second excitation occurs. The communications devices (e.g., first communications device 110 and second communications device 120) may have highly accurate time information (e.g., information from a crystal oscillator, information from a Global Positioning System, or information from a network server) that can be used to measure a characteristic value based on the time elapsed between a pair of excitations. In some embodiments, a device can measure the time that each excitation occurs by monitoring, for example, when the magnitude of the sensor output crosses a threshold or when the slope of the sensor output crosses a threshold. Each time the communications device determines that an excitation has occurred, the device can capture the precise time (e.g., from a Global Positioning System or network server). The device can then use these times to calculate the elapsed time between two excitations and measure a characteristic value accordingly. In some embodiments, a device may store the time that each excitation occurs and then compare the two times to calculate the time elapsed between the excitations. In other embodiments, a device may start a timer when the first excitation occurs and stop the timer when the second excitation occurs so that the timer reflects the time elapsed between the two excitations.

It is understood that excitation properties, such as duration and peak magnitude, may be affected by various factors including the duration of the stimulus, the intensity of the stimulus, the orientation of each device's sensor relative to the stimulus, or the proximity of each device's sensor to the stimulus. However, the time elapsed between a first excitation and a second excitation may be relatively unaffected by these factors. Accordingly, it may be advantageous to measure a characteristic value based on the time elapsed between a first excitation and a second excitation because the measurement may be relatively constant for all devices that experience the common physical stimuli.

Using one or more identified characteristic values, each device can generate an authentication key for a communications protocol. A device can use one or more identified characteristic values as a seed for generating the authentication key. For example, a device can include control circuitry (e.g., control circuitry 114 or control circuitry 124) that can use an identified characteristic value as a seed to generate an authentication key. Any suitable algorithm can be used to generate the authentication key as a function of the seed. For example, a communications device can use an algorithm based on one or more hash functions, polynomial functions, exponential functions, logarithmic functions, any other suitable mathematical functions or any combinations thereof. The algorithm used to generate an authentication key may be deterministic (e.g., it may predictably produce the same output given a particular input). If several devices experience the same physical stimulus or stimuli, each device will have the same characteristics value to use as a seed and, therefore, will independently generate the same authentication key.

Different communications protocols may use different authentication keys. In some embodiments, the algorithm a device uses to generate an authentication key may be associated with a particular communications protocol. For example, an algorithm that generates a 4-digit PIN may be associated with a Bluetooth® protocol while an algorithm that generates a 64-bit or 128-bit Wired Equivalent Privacy (WEP) key may be associated with an 802.11 protocol. In some embodiments, a device may support multiple communications protocols and may generate a different authentication key for each protocol based on one or more common stimuli. The device may then store the keys (e.g., in storage or memory) so that, depending on the communications protocol being used, the appropriate key can be accessed later.

Communications devices can measure characteristic values in sensor output at any suitable time. For example, a communications device can continuously monitor sensor output whenever the device is powered on. In another example, a communications device may only monitor sensor output in response to a user input. In some embodiments, a user may select an option to specify whether a device monitors sensor output continuously or only in response to a user input.

Figure 4:
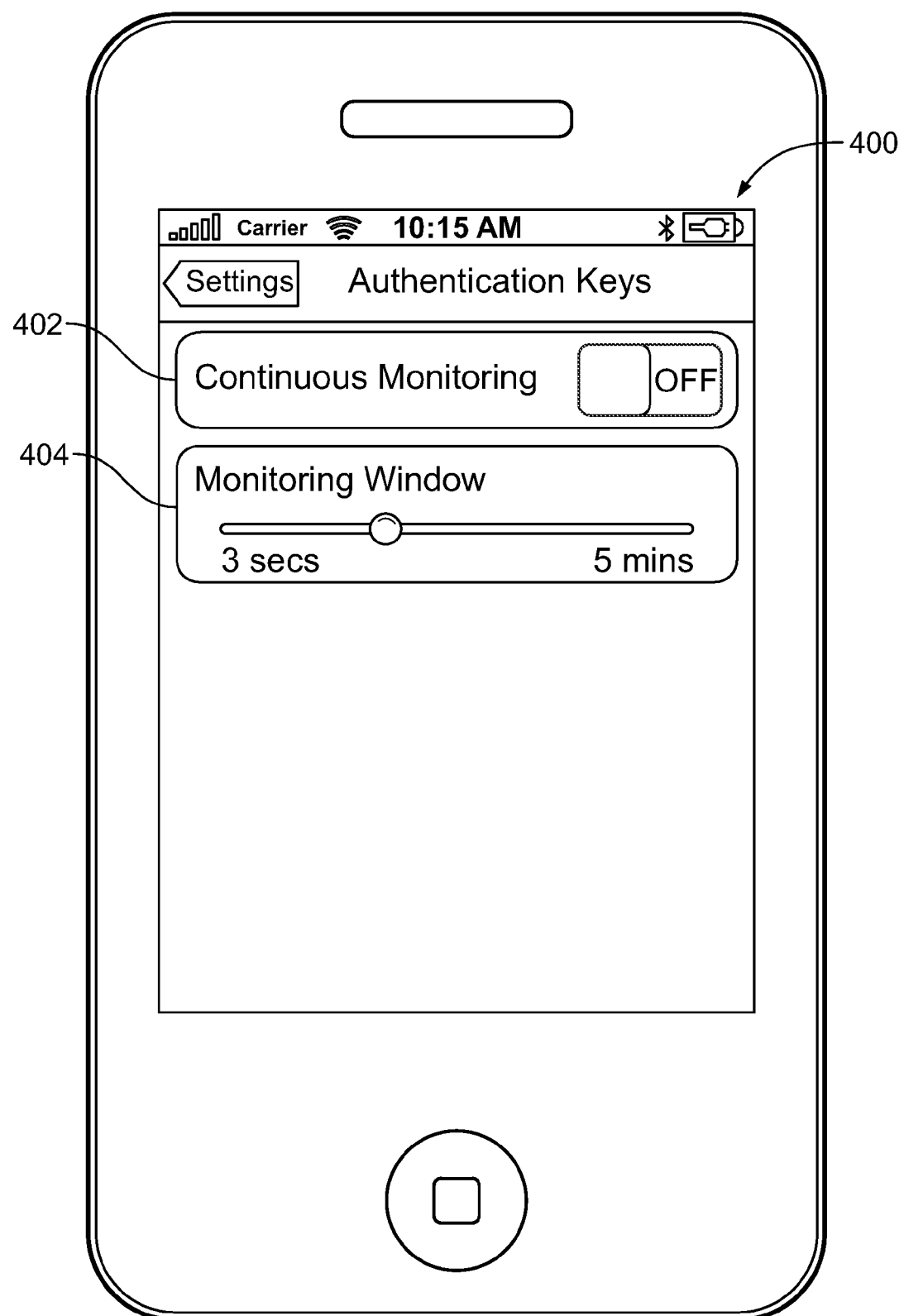
FIG. 4 is a schematic view of an illustrative configuration screen in accordance with one embodiment of the invention.

FIG. 4 is a schematic view of an illustrative display screen that a communications device can provide in accordance with one embodiment of the invention. Display screen 400 can be provided on a touch screen so that a user can provide an input by directly touching virtual buttons on the screen. A communications device can provide display screen 400 as part of the device's configuration options, for example when a user accesses the configuration options for generating authentication keys, or the first time the device attempts to form a secure network. Screen 400 can include options for controlling the generation of authentication keys. Option 402 can correspond to how often the communications device monitors sensor output (e.g., to measure a characteristic value). If option 402 is switched on, the communications device may continuously monitor sensor output. If option 402 is switched off, the communications device may only monitor sensor output in response to a user input (e.g., a user instructing the device to establish a secure network with another device). In such a situation, option 404 can correspond to the amount of time that the communications device will monitor sensor outputs after the user input. For example, option 404 can be a slider bar with values ranging from 3 seconds to 5 minutes, and the value that the slider bar is set to may control the amount of time that the device will monitor sensor output after receiving a user input.

In some embodiments, there may be various advantages to disabling continuous sensor monitoring. For example, a communications device may save power by only monitoring sensor output during a time period immediately following a user input. Such a power savings can be especially beneficial in a battery-powered communications device. In another example, disabling continuous sensor monitoring may have the advantage of added security. For example, a communications device configured to monitor sensor output only in response to a user input may need to receive the input before a physical stimulus is provided. Such a configuration may prevent a communications device from accidentally forming a secure network when a user hasn't provided the requisite input. Accordingly, the device may be less susceptible to forming unwanted and potentially unsafe networks with nearby devices.

Once two or more communications devices are monitoring their respective sensor output, any suitable physical stimulus or stimuli that affects all of the devices can be used to generate an authentication key. Movements suitable for providing one or more physical stimuli include, for example, tapping (e.g., bumping) the devices together one or more times, holding the devices together and shaking them, moving the devices in a common, synchronized motion, or any combination thereof. Other suitable physical stimuli include, for example, common light detected by the devices, common sound detected by the devices, any other common detection of emitted radiation, or any combination thereof. In situations where users may not completely trust each other, physical stimuli that allow each device's user to retain possession of his device (e.g., tapping two devices against each other) may be advantageous over physical stimuli that requires a single user to hold the devices (e.g., holding the devices together and shaking them).

In some embodiments, a communications device may notify the user when it is monitoring sensor output and ready for one or more physical stimuli. The device may provide a display instructing the user on how to provide one or more physical stimuli to the device. Along with instructions for providing stimuli, the display may include indicators specifying the amount of time remaining for providing the stimuli and/or the progress of providing the stimuli.

Figure 5:
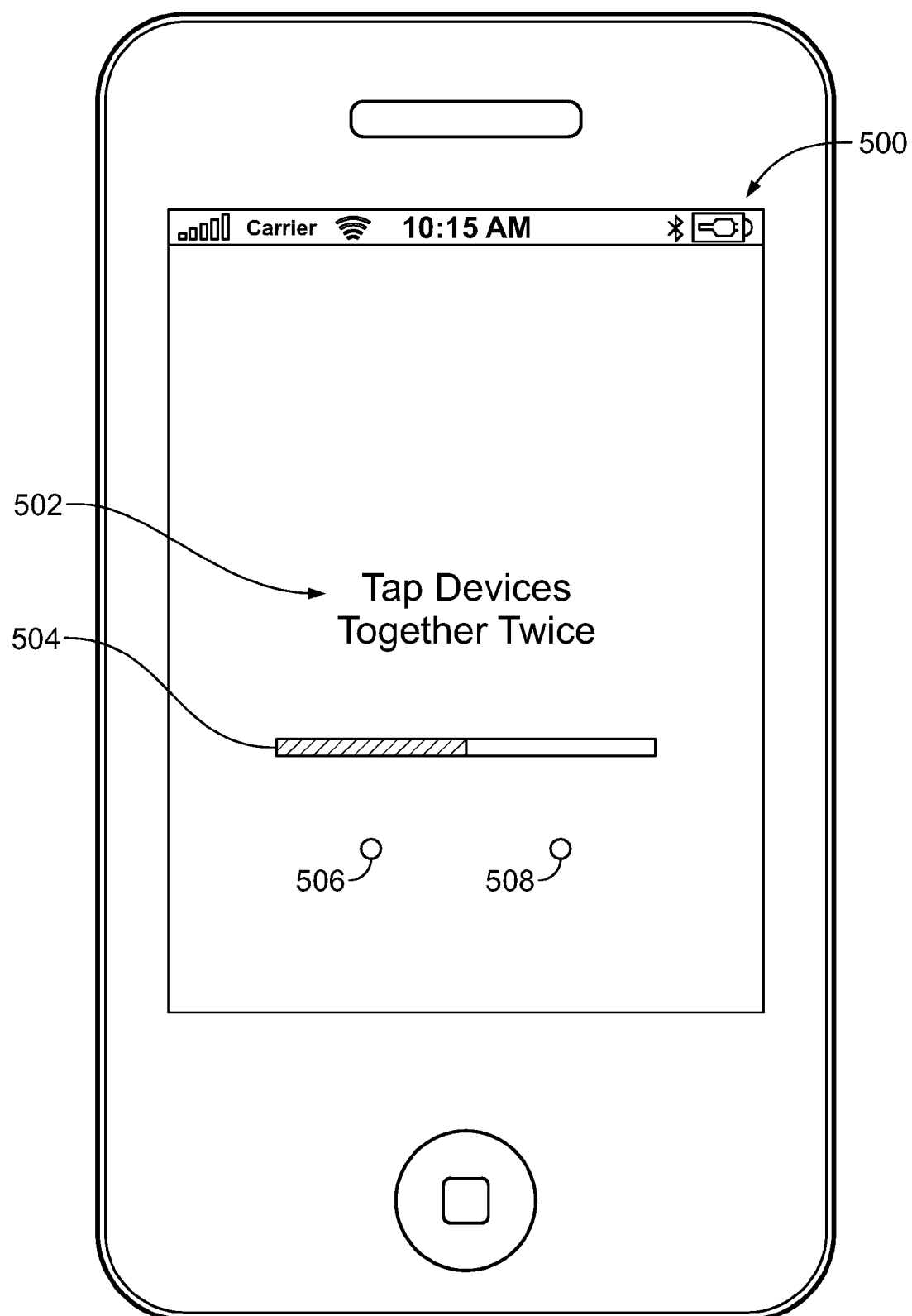
FIG. 5 is a schematic view of an illustrative status screen in accordance with one embodiment of the invention.

FIG. 5 is a schematic view of an illustrative display screen that a communications device can provide in accordance with one embodiment of the invention. Display screen 500 can include message 502 instructing the user to provide one or more physical stimuli. In the embodiment shown in FIG. 5, message 502 can instruct the user to tap the device against another device twice. In other embodiments, a communications device can instruct the user to provide any other suitable type or number of physical stimuli. For example, a communications device can instruct the user to provide stimuli by holding the two devices and shaking them.

In some embodiments, display screen 500 can notify a user how much time is remaining to provide one or more physical stimuli. If continuous sensor monitoring is disabled (e.g., option 402 of screen 400 is switched off), the device may only monitor sensor output for a limited period of time following a user input. In such a scenario, a user may want to know the amount of time remaining to provide the one or more stimuli. To display such information, screen 500 may include, for example, timer 504 that represents the time remaining for sensor monitoring. An indicator in timer 504 may move across screen 500 as the amount of remaining time diminishes.

In some embodiments, a communications device can notify a user regarding how many physical stimuli have been detected. For example, generating an authentication key may require multiple stimuli (e.g., tapping two devices together twice or moving two devices in a specific pattern multiple times) and a user may want to know how many stimuli have already been detected. A communications device can notify a user through, for example, a visual display, audio alert, any other suitable output mechanism, or any combination thereof. For example, display screen 500 can include first graphical indicator 506 and second graphical indicator 508 that represent how many physical stimuli have been detected when generating an authentication key. When the communications device detects a first excitation in the sensor output (see, e.g., excitation 312 of FIG. 3), first graphical indicator 506 may change colors so that the user can see that a first physical stimulus has been detected. After the communications device detects a second excitation in the sensor output (see, e.g., excitation 314 of FIG. 3), second graphical indicator 508 may change colors so that the user can see that a second physical stimulus has been detected. Accordingly, a user can determine if he has provided enough stimuli to generate an authentication key.

In some embodiments, the option to generate an authentication key and form a secure network can be integrated into a stand-alone application. For example, a user can select a stand-alone application for generating an authentication key and forming a secure network with another device.

Figure 6A:
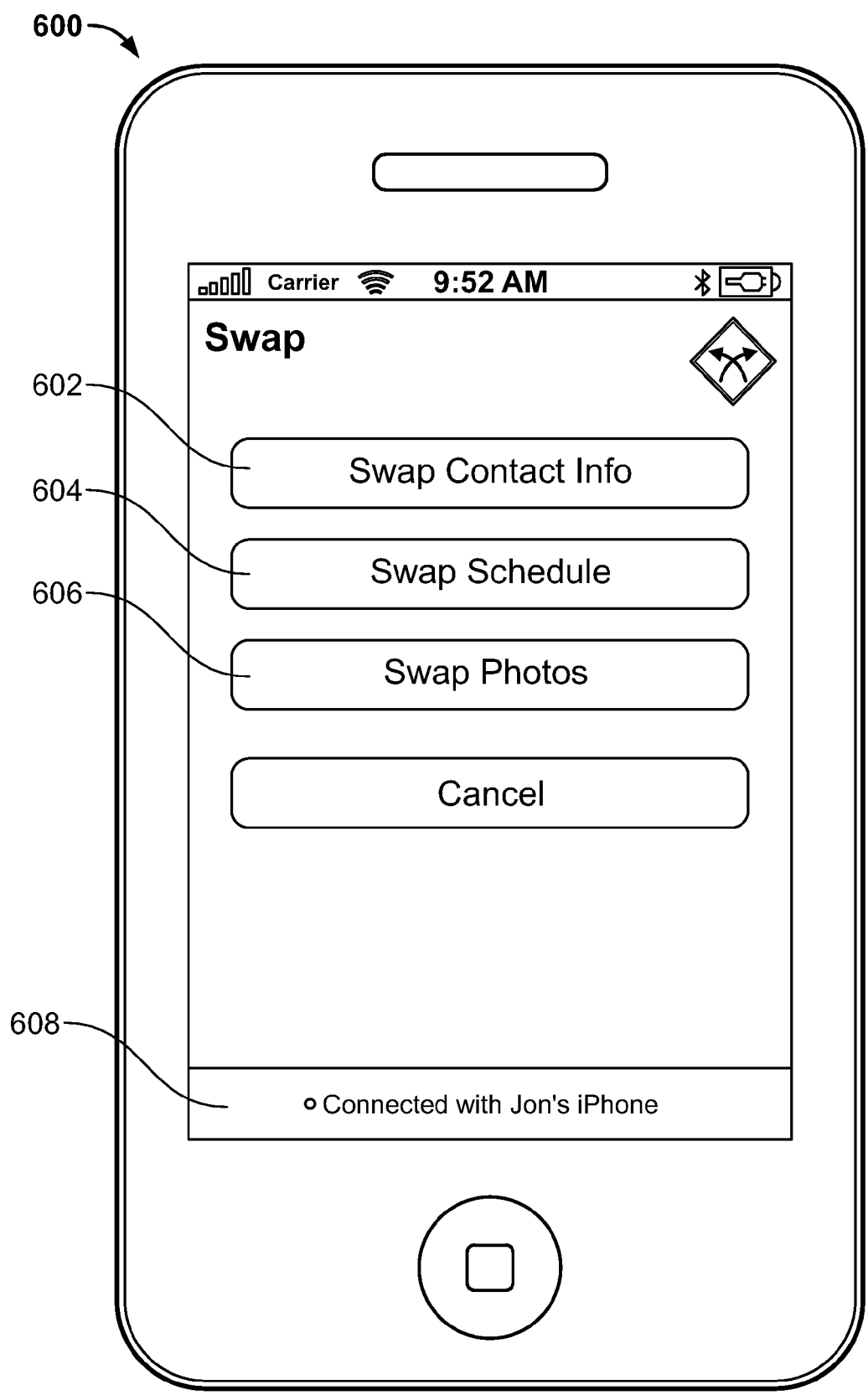
FIGS. 6A-6C are schematic views of illustrative display screens in accordance with one embodiment of the invention.

FIG. 6A is a schematic view of an illustrative display screen that a communications device can provide in accordance with one embodiment of the invention. Display screen 600 can be provided on a touch screen, and a user can provide an input by directly touching virtual buttons on the screen. A communications device can provide display screen 600 after a user has initiated a stand-alone application for generating an authentication key and forming a secure network to share information.

Screen 600 can include one or more buttons for sharing information over a secure wireless network. For example, screen 600 can include button 602 for sharing contact information, button 604 for sharing schedule information (e.g., calendar information), button 606 for sharing digital images, and any other buttons for sharing information over a secure wireless network. In some embodiments, screen 600 can include indicator 608 specifying that a secure network already exists and identifying the other device.

In connection with a stand-alone application for sharing information, a device can generate an authentication key and form a secure network at any suitable time. In some embodiments, a device can generate an authentication key and form a secure network when the application is launched and before screen 600 is provided to the user. For example, a device may provide screen 500 that includes instructions for providing one or more stimuli when a user launches a stand-alone application for sharing information. After screen 500, a device may provide screen 600 that can represent the secure network using indicator 608. In some embodiments, a device can first provide screen 600 and then generate an authentication key and form a secure network in response to a user selecting one of buttons 602, 604, or 606. For example, a device may provide screen 500 in response to a user selecting one of buttons 602, 604, or 606.

After a user selects an option (e.g., one of buttons 602, 604, or 606) to share a type of information with another user's device, a device can provide a user with options for sharing that information. For example, the device may provide a user with options to specify the information to be shared with another device. If a user selects button 602, the device may provide the user with a screen to specify which contact information to share with another device. If a user selects button 604, the device may provide the user with a screen to specify which calendar information (e.g., one or more portions of the user schedule) to share with another device. If a user selects button 606, the device may provide the user with a screen to specify which digital photos to share with another device.

Figure 6B:
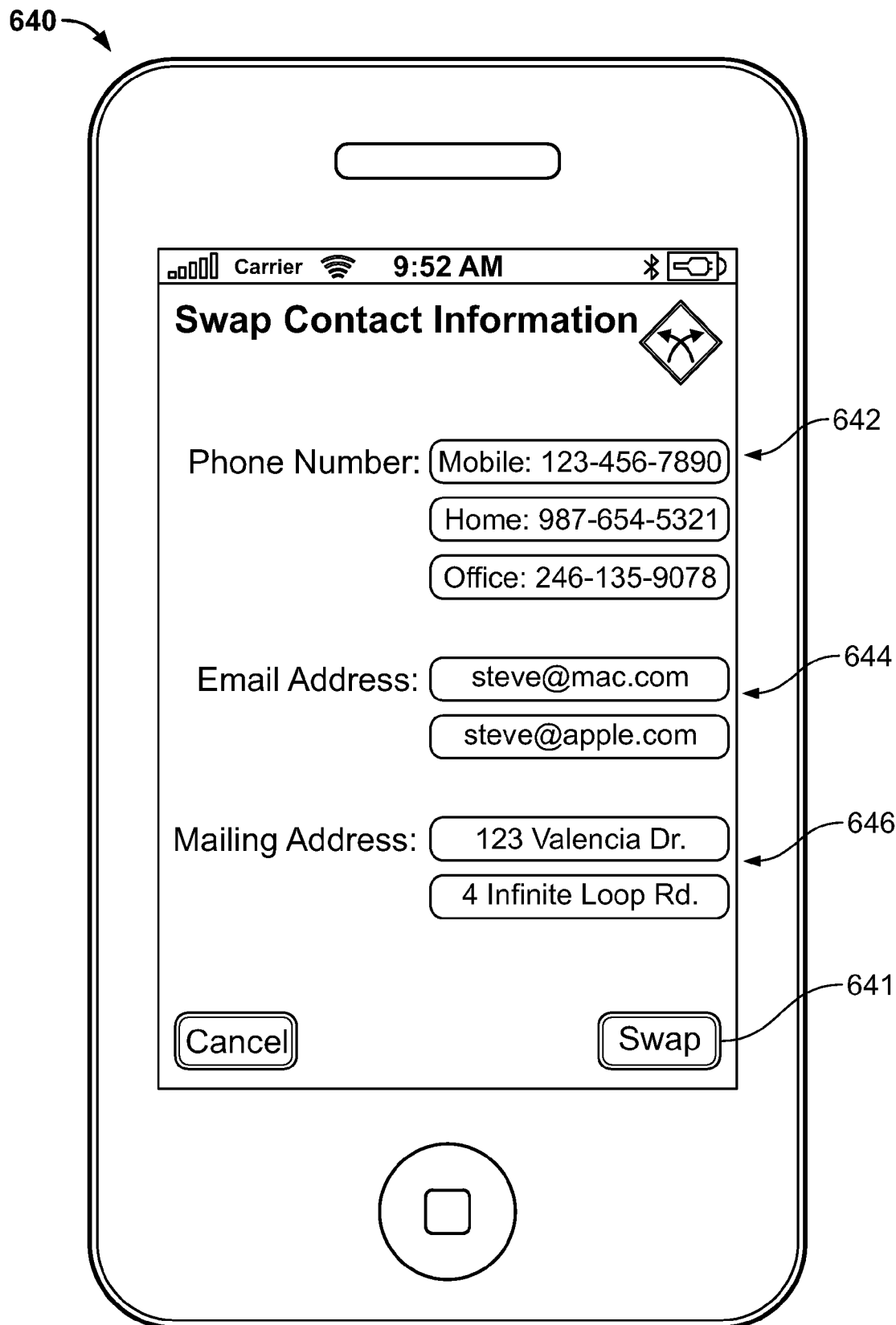

FIG. 6B is a schematic view of an illustrative display screen that a communications device can provide in accordance with one embodiment of the invention. Display screen 640 can be provided on a touch screen, and a user can provide an input by directly touching virtual buttons on the screen. A communications device can provide display screen 640 to receive a user input specifying contact information to share with another device. Screen 640 may include one or more buttons representing the user's contact information. For example, screen 640 can include one or more buttons 642 representing the user's phone numbers, one or more buttons 644 representing the user's email addresses, one or more buttons 646 representing the user's mailing addresses, and any other suitable buttons representing the user's contact information (e.g., a button representing the user's instant messaging handle or voice over internet protocol handle). A user may select one or more of buttons 642, 644, and 646 to specify contact information for sharing with another device. For example if a user is meeting a new business associate, the user may select only professional contact information (e.g., work phone number or work e-mail address) to share with the new associate's device. In some embodiments, a user may be able to select a single option (not shown) to specify a set of contact information (e.g., a virtual business card) for sharing with another device. Screen 640 may include swap button 641 that a user can select to share the specified contact information with another device.

In some embodiments, the device may also receive contact information from another device. For example after a user selects swap button 641 and the device shares information with another device, the device may provide a display screen representing the received contact information from another device. Such a screen may include one or more buttons similar to buttons 642, 644, and/or 646 for representing received contact information. In some embodiments, a user may select one or more of the buttons to specify received contact information, and the screen may include an option (e.g., a button) to save the specified information as a new contact in the user's address book.

Figure 6C:
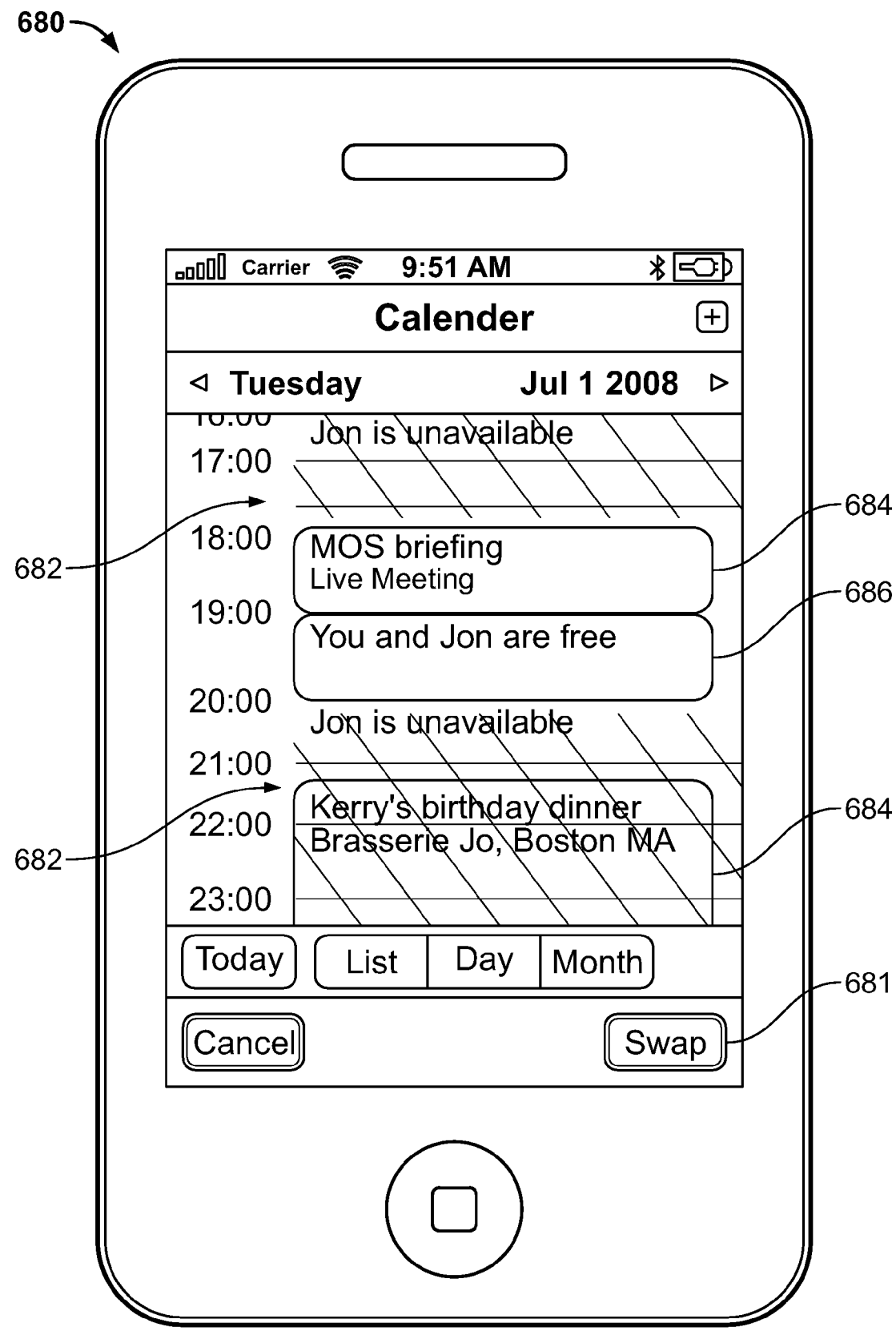

When a user selects an option to share calendar information with another device (e.g., button 604), the user may be able to select what calendar information the user wants to share with the other device. For example, a user may be able to specify a range of dates and/or times from the user's calendar for sharing with another device. After a device has shared all calendar information or a specified subset of calendar information with another device, the device may present the user with a screen showing an overlay of each device's calendar and/or any time ranges when both users are available. FIG. 6C is a schematic view of an illustrative display screen that a communications device can provide in accordance with one embodiment of the invention. Display screen 680 can be provided on a touch screen, and a user can provide an input by directly touching virtual buttons on the screen. A communications device can provide display screen 680 to display calendar information received from another device. Screen 680 may include swap button 681 to receive new or updated calendar information from another device. Screen 680 may include one or more indicators to provide received calendar information to a user. In some embodiments, screen 680 also can include one or more indicators representing the user's existing calendar information (e.g., existing events) and one or more indicators representing calendar slots for which both users are available. For example, screen 680 can include one or more indicators 682 representing received information about another user's calendar (e.g., information about the other user's events), one or more indicators 684 representing information about the primary user's existing calendar (e.g., information about the primary user's existing events), and one or more indicators 686 representing time ranges for which both users are available.

In some embodiments, the option to generate an authentication key and form a secure network can be integrated into various application windows. For example, the option to generate an authentication key and form a secure network can be integrated into windows for adding a new address book contact or creating a new calendar event.

Figure 7:
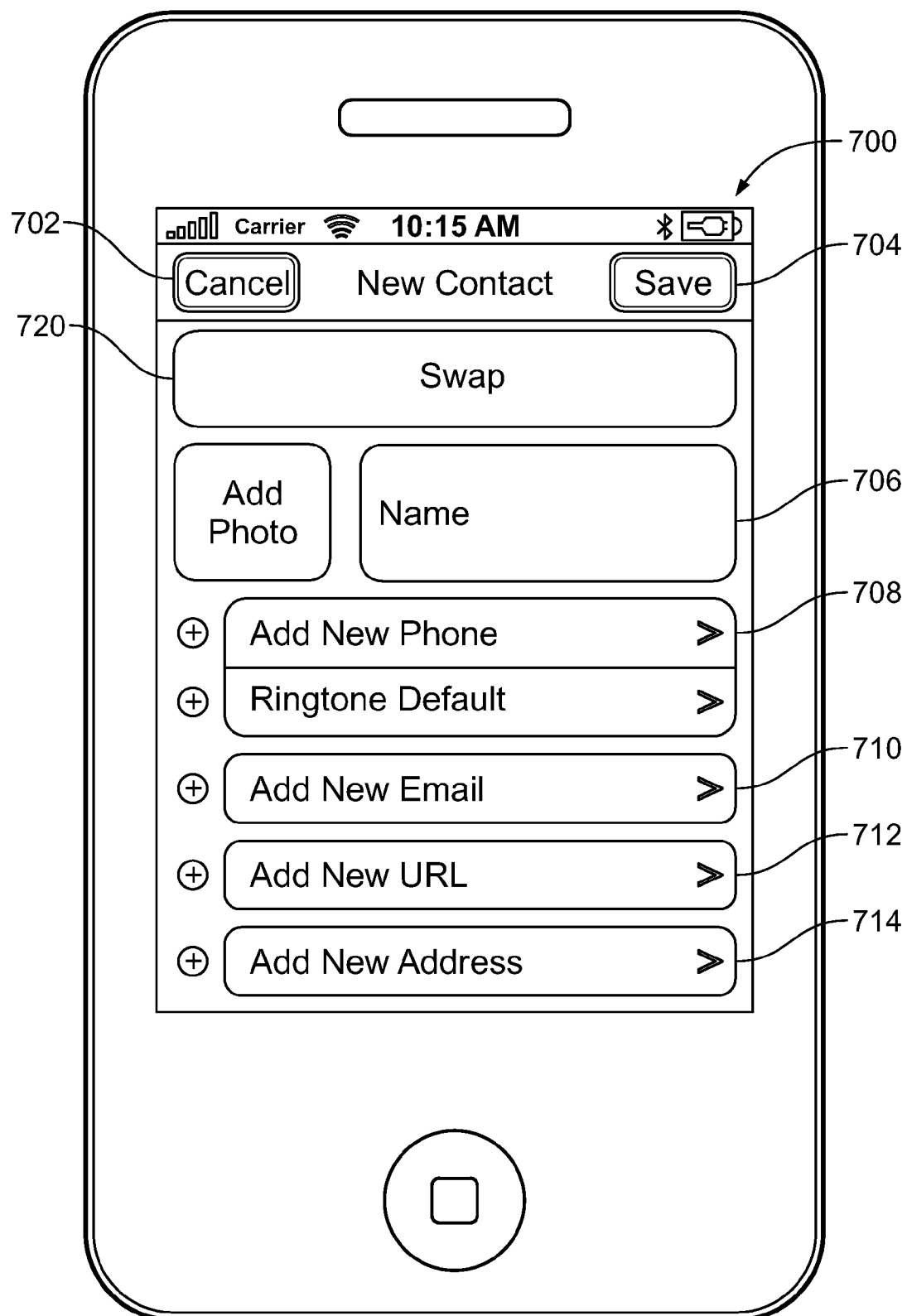
FIG. 7 is a schematic view of an illustrative contact creation screen in accordance with one embodiment of the invention.

FIG. 7 is a schematic view of an illustrative display screen that a communications device can provide in accordance with one embodiment of the invention. Display screen 700 can be provided on a touch screen, and a user can provide an input by directly touching virtual buttons on the screen. A communications device can provide display screen 700 during the process of creating or editing a contact. For example, display screen 700 can be provided by a communications device (see, e.g., first communications device 110 or second communications device 120) when a user initiates the process of adding a new contact to his address book.

Display screen 700 can include navigations options such as "cancel" button 702 and "save" button 704. Display screen 700 can include manual entry options such as "name" button 706, "add new phone" button 708, "add new email" button 710, "add new URL" button 712, and "add new address" button 714. A user can select any of the manual entry options to input information about the contact. For example, a user can select "name" button 706 and use an on-screen keyboard to type in the new contact's name. However, in order to more quickly add a new contact and the corresponding information, display screen 700 can include "swap" button 720. A user can select "swap" button 720 to generate an authentication key and form a secure network in accordance with the disclosure (see, e.g., discussion related to FIGS. 2-5). Once the secure network is formed, the device providing display screen 700 can receive contact information from another device on the network (e.g., the name, phone number, and email address of a contact stored on that device). In some embodiments, the device can provide a screen for creating a new contact based on the received contact information (see, e.g., screen 640). In some embodiments, the device providing display screen 700 may also send contact information to another device on the network. For example, the device providing display screen 700 can use the secure network to send contact information (e.g., name, phone number, and email address of a contact stored on the device) to another device as well as receive contact information from the other device. After the information is transferred, each device can create a new contact representing the received information. Accordingly, one or more new contacts can be created without performing any tedious manual input.

It is understood that the contact information transferred between devices can include contact information about each device's user and/or contact information about one or more third-parties. For example, two or more devices can share contact information about their respective users. In another example, a user may select a contact from his address book and instruct his device to send information about that contact to one or more devices belonging to other users. In yet another example, two or more devices can share all of the contact information in their address books.

Figure 8:
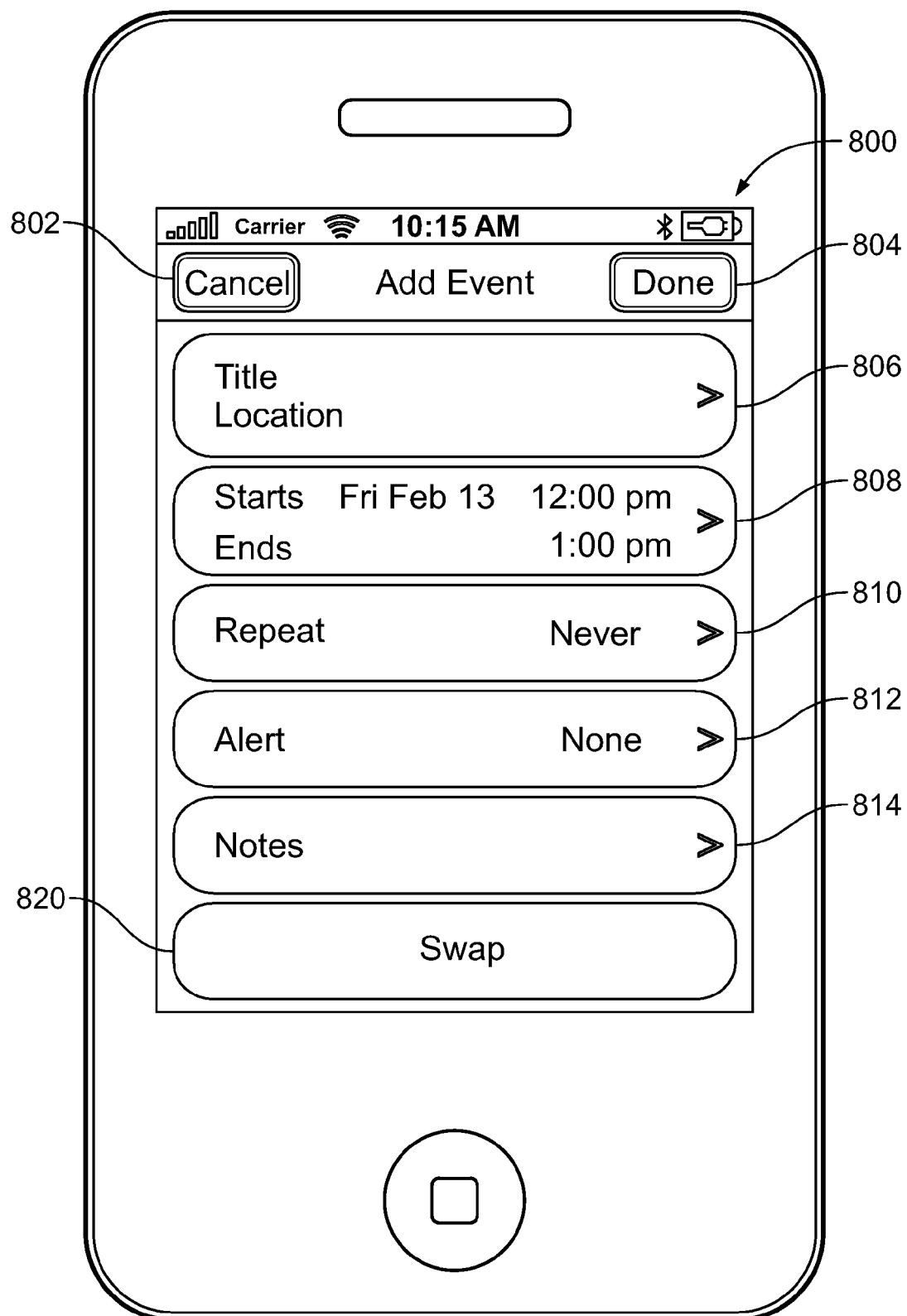
FIG. 8 is a schematic view of an illustrative event information screen in accordance with one embodiment of the invention.

FIG. 8 is a schematic view of an illustrative display screen that a communications device can provide in accordance with one embodiment of the invention. Display screen 800 can be provided on a touch screen, and a user can provide an input by directly touching virtual buttons on the screen. A communications device can provide display screen 800 during the process of creating or editing a calendar event. For example, display screen 800 can be provided by a communications device (see, e.g., first communications device 110 or second communications device 120) when a user initiates the process of creating a new event in his calendar.

Display screen 800 can include navigations options such as "cancel" button 802 and "done" button 804. Display screen 800 can include manual event detail options such as "title/location" button 806, "starts/ends" button 808, "repeat" button 810, "alert" button 812, and "notes" button 814. A user can select any of the manual entry options to input information about the event. For example, a user can select "title/location" button 806 and use an on-screen keyboard to type in the new event's title. However, in order to more quickly add event information, display screen 800 can include "swap" button 820. A user can select "swap" button 820 to generate an authentication key and form a secure network in accordance with the disclosure (see, e.g., discussion related to FIGS. 2-5). Once the secure network is formed, the device providing display screen 800 can receive event information from another device on the network (e.g., the title, location, start time, and end time of the event) and create a new event based on the event information. In some embodiments, the device providing display screen 800 may also send event information to another device on the network. For example, a user may select an event and instruct his device to share the event's information with another device. In some embodiments, the device providing display screen 800 can send information to and receive information from another device on the network so that the two devices can collaboratively determine a suitable time for a new event based on each user's calendar (see, e.g., screen 680). Accordingly, event information can be shared without performing any tedious manual input or lookup.

It is understood that the embodiments shown in FIGS. 6A-6C, 7, and 8 are merely illustrative, and that an authentication key can be generated in accordance with the disclosure (see, e.g., discussion related to FIGS. 2-5) for any suitable purpose. For example, an authentication key can also be generated to form a secure network for sharing data, image or music files.

Figure 9:
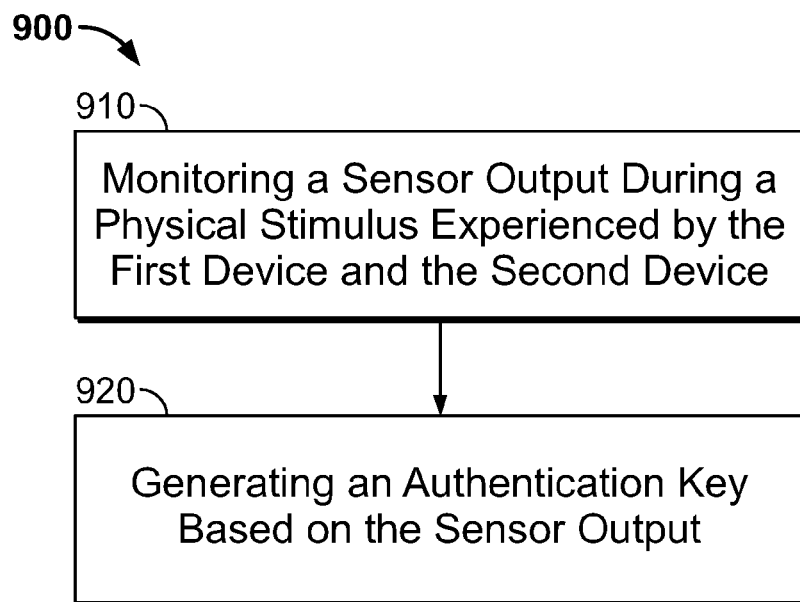
FIG. 9 is a flow chart of an illustrative process for generating an authentication key in accordance with one embodiment of the invention.

FIG. 9 is a flow chart of an illustrative process for generating an authentication key in accordance with one embodiment of the invention. Process 900 can be used to generate an authentication key based on a common physical stimulus. In some embodiments, the authentication key can be used to form a secure network between a first communications device (e.g., first communications device 110 of FIG. 1) and a second communications device (e.g., second communications device 120 of FIG. 1). Process 900 may begin with step 910.

At step 910, a sensor output can be monitored during a physical stimulus experienced by the first device and the second device. In some embodiments, the sensor output may be monitored in response to receiving a user input (see, e.g., discussion related to FIGS. 6A-6C, 7, and 8). The first device may instruct a user on how to provide a physical stimulus during step 910. For example, the first device may provide a display screen (e.g., screen 500) instructing the user on how to provide a physical stimulus (e.g., tap the first device and the second device together).

The sensor output monitored at step 910 may be an accelerometer output. In some embodiments, a plurality of sensor outputs can be monitored. For example, a plurality of accelerometer outputs, such as at least one output for each axis of motion, can be monitored. In some embodiments, a sensor output can be monitored during two or more physical stimuli experienced by the first device and the second device (see, e.g., discussion related to FIGS. 3 and 5).

At step 920, an authentication key can be generated based on the sensor output. For example, the authentication key can be generated based on an excitation in the sensor output that corresponds to the physical stimulus. In some embodiments, generating an authentication key can include measuring a characteristic value of the sensor output. For example, a characteristic value can be based on a temporal property of the sensor output, such as excitation start time or excitation duration. Generating an authentication key can include performing an algorithm that uses the measured characteristic value as a seed. For example, a device can perform an algorithm, including one or more mathematical calculations or table look-ups, on the measured characteristic value to generate an authentication key.

In some embodiments, a secure network between the first device and the second device can be formed based on the authentication key generated at step 920. For example, process 900 can include a third step in which the first device can form a secure, peer-to-peer wireless network with the second device based on the authentication key. The characteristic value and algorithm used to generate an authentication key based on the sensor output may be selected so that two or more devices can each generate an authentication key with the same value after experiencing a common physical stimulus. In some embodiments, a secure network in accordance with a Bluetooth® communications protocol can be formed. For example, an authentication key can be a PIN that is used to form a secure Bluetooth® network between the first device and the second device.

Figure 10:
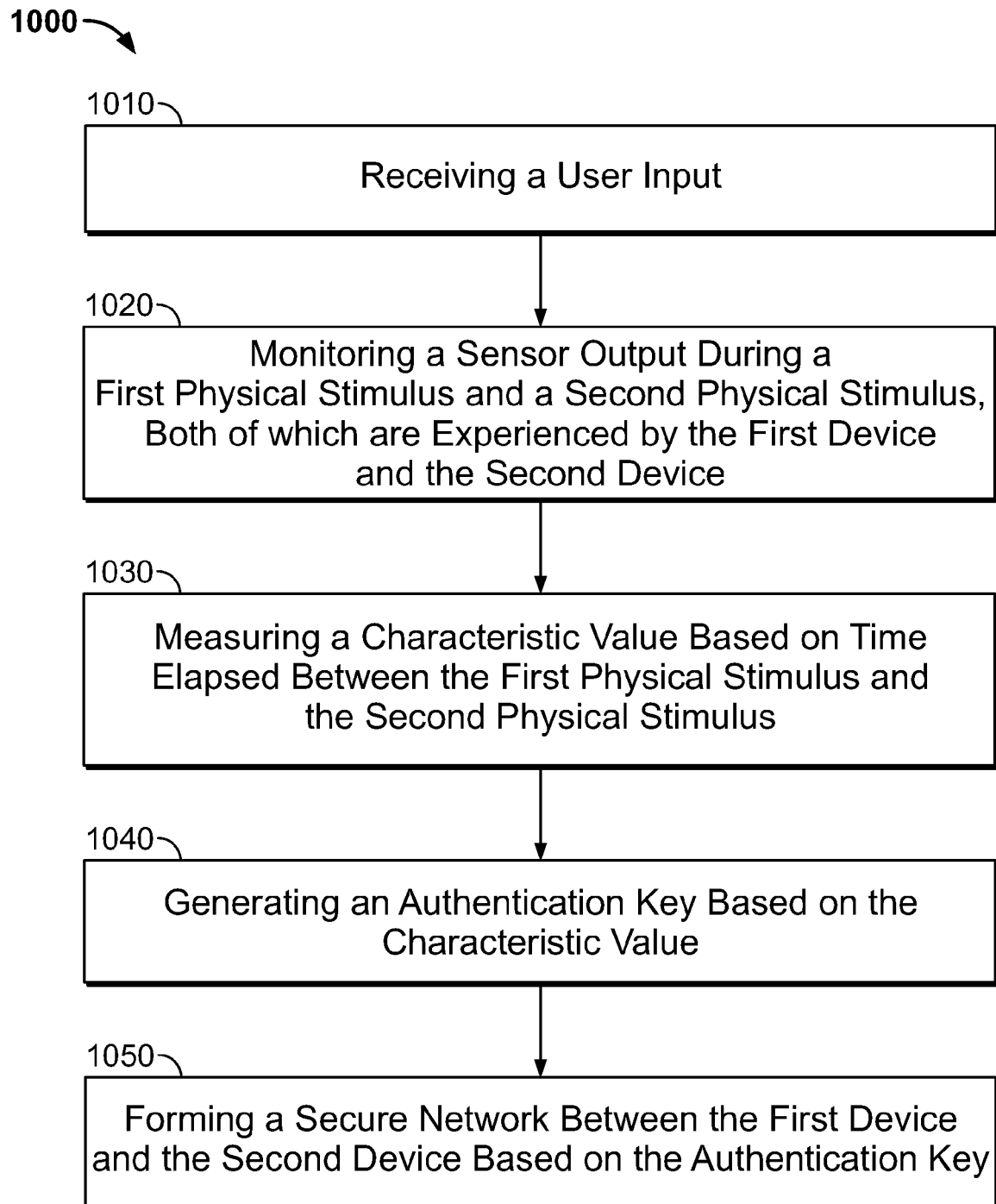
FIG. 10 is a flowchart of an illustrative process for generating an authentication key in accordance with one embodiment of the invention.

FIG. 10 is a flow chart of an illustrative process for generating an authentication key in accordance with one embodiment of the invention. Process 1000 can be used to generate an authentication key based on two or more common physical stimuli. In some embodiments, the authentication key can then be used to form a secure network between a first communications device (e.g., first communications device 110 of FIG. 1) and a second communications device (e.g., second communications device 120 of FIG. 1). Process 1000 may begin with step 1010.

At step 1010, a user input can be received. The user input can be provided by the first device's user to initiate process 1000. For example, the first device may perform a function that requires information from another device and the user can provide an input to initiate the generation of an authentication key (see, e.g., discussion related to FIGS. 6A-6C, 7, and 8).

At step 1020, a sensor output can be monitored during a first physical stimulus and a second physical stimulus, both of which are experienced by the first device and the second device. In some embodiments, the first device and/or second device may instruct its user to provide physical stimuli at step 1020. For example, the first device may provide a display (e.g., screen 500) instructing the user on how to provide physical stimuli during step 1020. The sensor output monitored at step 1020 may be an accelerometer output. In some embodiments, a plurality of sensor outputs can be monitored. For example, a plurality of accelerometer outputs, such as at least one output for each axis of motion, can be monitored. Sensor outputs can be monitored by control circuitry (e.g., control circuitry 114) or any other suitable circuitry in a communications device.

At step 1030, a characteristic value of the sensor output can be measured based on time elapsed between the first physical stimulus and the second physical stimulus. For example, a sensor output may include a first excitation corresponding to the first physical stimulus (e.g., excitation 312 of FIG. 3) and a second excitation corresponding to the second physical stimulus (e.g., excitation 314 of FIG. 3), and a device can measure a characteristic value by measuring the time elapsed between the first and second excitations. The time elapsed can be calculated as the time difference between the beginning of each excitation (e.g., the difference between Ts1 302 and Ts2 304 of FIG. 3). While the characteristic value measured at step 1030 is based on time elapsed, it is understood that any other suitable type of characteristic value can be measured for generating an authentication key. However, it may be advantageous if the type of characteristic value used to generate an authentication key is chosen so that the sensor output of two or more devices each has the same characteristic value in response to common physical stimuli. The characteristic value can be measured by control circuitry (e.g., control circuitry 114) or any other suitable circuitry in a communications device.

At step 1040, an authentication key can be generated based on the characteristic value measured at step 1030. For example, an authentication key can be generated using the characteristic value measured at step 1030 as a seed for an algorithm. For example, a device can perform an algorithm that includes one or more mathematical calculations or table look-ups to generate an authentication key based on the characteristic value. The algorithm used to generate an authentication key may be deterministic so that two or more devices that measured the same characteristic value from common stimuli can each generate an authentication key having the same value. In some embodiments, a communications protocol may require an authentication key in a particular format (e.g., a four-digit PIN), and the authentication key generated at step 1040 may be in the appropriate format. An authentication key may be generated by control circuitry (e.g., control circuitry 114) or any other suitable circuitry in a communications device.

At step 1050, a secure network can be formed between the first device and the second device based on the authentication key generated at step 1040. For example, the first device can form a secure, peer-to-peer wireless network with the second device based on the authentication key. In some embodiments, a secure network in accordance with a Bluetooth® communications protocol can be formed. For example, an authentication key can be a PIN that is used to form a secure Bluetooth® network between the first device and the second device.

In some embodiments, an electronic device can detect the presence of another device before generating an authentication key. For example, a first device can detect the presence of another device using an unsecured wireless network before generating an authentication key. In such embodiments, the devices may be able to coordinate when each device monitors sensor outputs and decrease the chance that authentication keys are generated based on different physical stimuli.

Figure 11:
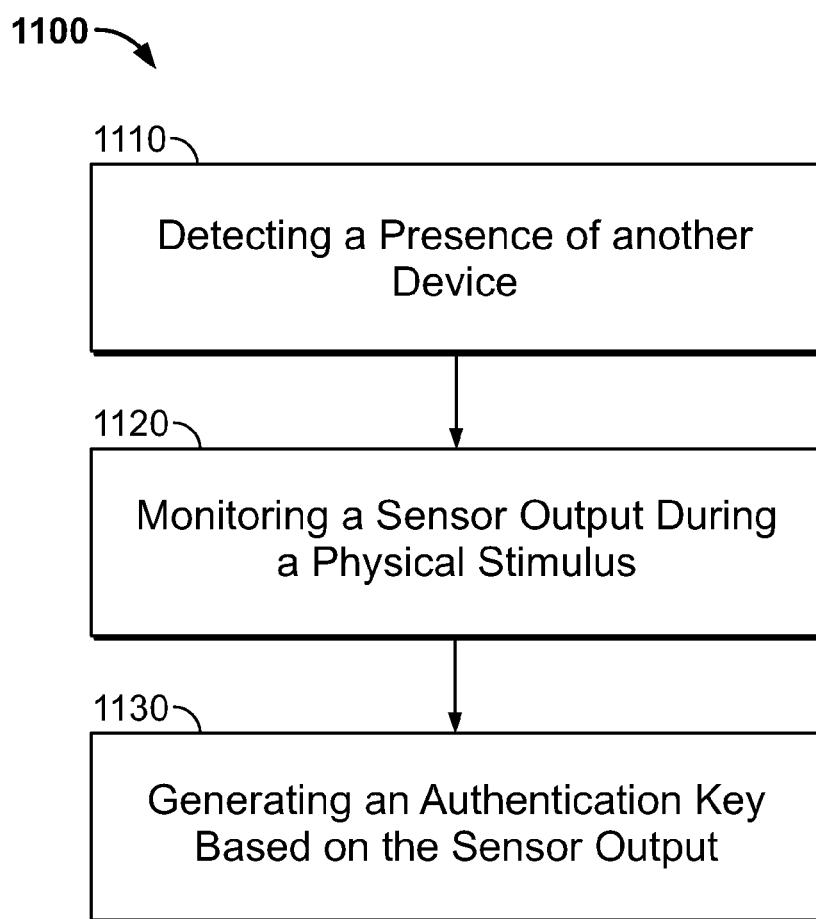
FIG. 11 is a flowchart of an illustrative process for generating an authentication key in accordance with one embodiment of the invention.

FIG. 11 is a flow chart of an illustrative process for generating an authentication key in accordance with one embodiment of the invention. Process 1100 can be used to generate an authentication key after a first communications device (e.g., first communications device 110 of FIG. 1) has detected the presence of a second communications device (e.g., second communications device 120 of FIG. 1). In some embodiments, the authentication key can then be used to form a secure network between the first communications device and the second communications device. Process 1100 may begin with step 1110.

At step 1110, the presence of another device may be detected. For example, a first communications device may detect the presence of a second communications device. The first device can detect the presence of the second device using any suitable detection technique. For example, the first communications device may detect the presence of the second communications device by receiving an unsecured wireless communication from the second device.

At step 1120, a sensor output can be monitored during a physical stimulus. For example, the first device can monitor a sensor output during a physical stimulus. Step 1120 may be generally similar to step 910 of process 900 and the previous description of the latter can be applied to the former. In some embodiments, the first device may notify the second device before step 1120. For example, the first device may send a wireless communication to the second device before monitoring a sensor output. In this manner, the devices may coordinate when each device monitors its sensor output. Such coordination may prevent the devices from monitoring sensor outputs at different times and potentially detecting different physical stimuli. This may be advantageous because, if each device generates an authentication key based on a different stimulus, the devices may not be able to form a secure network using the key.

At step 1130, an authentication key can be generated based on the sensor output. For example, the first device can generate an authentication key based on its sensor output. Step 1130 may be substantially similar to step 920 of process 900 and the previous description of the latter can be applied to the former. In some embodiments, the first device can form a secure peer-to-peer wireless network with the second device using the authentication key generated at step 1130.

Process 1100 shows a method for generating an authentication key when a device is aware of the presence of another device. However, it is understood that an authentication key can be generated even if neither device is aware of the presence of another device. For example, each device may monitor a sensor output and generate an authentication key while oblivious to any nearby devices, and the devices may not take notice of each other until they use the authentication key to form a secure network.

In some embodiments, a user interface can be used to receive inputs from a user and guide a user in connection with generating an authentication key. For example, screen 640 of FIG. 6A, screen 700 of FIG. 7, or screen 800 of FIG. 8 can be used to receive an input from a user before generating an authentication key, and screen 500 of FIG. 5 can be used to guide a user on how to provide one or more physical stimuli when generating an authentication key.

Figure 12:
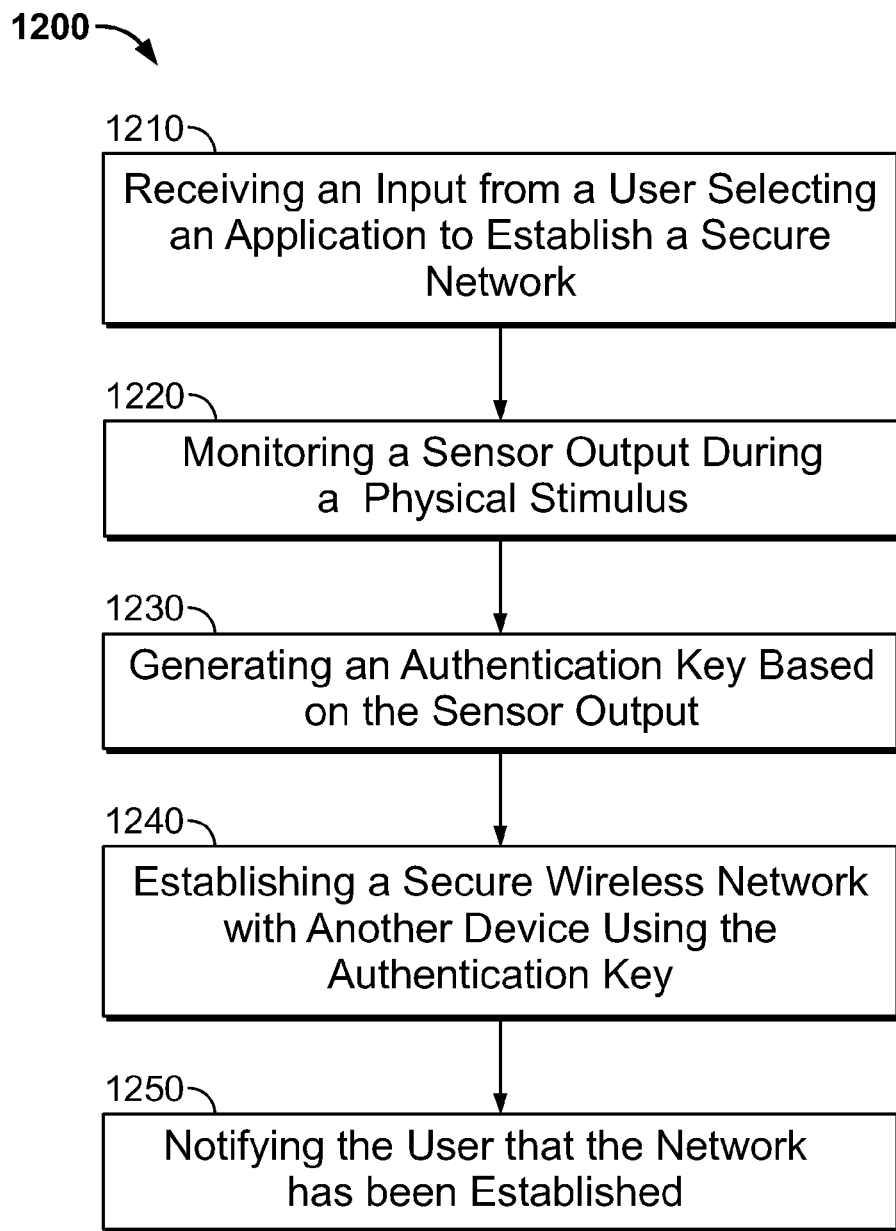
FIG. 12 is a flowchart of an illustrative process for generating an authentication key in accordance with one embodiment of the invention.

FIG. 12 is a flow chart of an illustrative process for generating an authentication key in accordance with one embodiment of the invention. Process 1200 can be used to generate an authentication key based on a physical stimulus experienced by a first communications device (e.g., first communications device 110 of FIG. 1) and a second communications device (e.g., second communications device 120 of FIG. 1). In some embodiments, the authentication key can then be used to form a secure network between the first communications device and the second communications device. Process 1200 may begin with step 1210.

At step 1210, a user input can be received that selects an application to establish a secure network. For example, a communications device may receive an input from a user selecting an application to establish a secure network. In some embodiments, the user may provide an input by choosing a swap option on a display screen (e.g., buttons 602, 604 or 606 on screen 600, button 720 on screen 700 or button 820 on screen 800).

At step 1220, a sensor output can be monitored during a physical stimulus. For example, a communications device can monitor a sensor output during a physical stimulus. Step 1220 may be substantially similar to step 910 of process 900 and the previous description of the latter can be applied to the former. In some embodiments, a user can be instructed to provide a physical stimulus at step 1220. For example, a communications device can instruct a user on how to provide a physical stimulus (see, e.g., message 502 and related discussion). In some embodiments, a user can be instructed to provide two or more physical stimuli at step 1220. For example, in embodiments where an authentication key may be based on two or more physical stimuli, a communications device can instruct a user on how to provide the physical stimuli as well as how many stimuli to provide (see, e.g., message 502). In some embodiments, a user can be notified regarding how many physical stimuli have occurred at step 1220. For example, in embodiments where an authentication key may be based on two or more physical stimuli, a communications device can provide one or more indicators representing how many stimuli have been provided (see, e.g., first graphical indicator 506 and second graphical indicator 508). In such embodiments, a user can watch the one or more indicators to keep track of the process. At step 1230, an authentication key can be generated based on the sensor output. Step 1230 may be substantially similar to step 920 of process 900 and the previous description of the latter can be applied to the former.

At step 1240, a secure wireless network can be established with another device using the authentication key. For example, a communications device (e.g., first communications device 110 of FIG. 1) can use the authentication key generated at step 1230 to establish a secure peer-to-peer wireless network with another communications device (e.g., second communications device 120 of FIG. 1).

At step 1250, a user can be notified that the network has been established. For example, an electronic device can provide a visual indicator (e.g., an icon) and/or audio alert (e.g., a tone) to notify the user that a secure network was formed at step 1240. A visual indicator can be provided on a device's display screen (e.g., screen 600, screen 640, screen 680, screen 700 or screen 800), and an audio alert can be provided through a speaker or other audio output circuitry (e.g., headphone jack).

In some embodiments, instead of two or more devices passively detecting one or more physical stimuli, one device can generate one or more stimuli that are detected by another device. For example, a first device may include a sensor for detecting stimuli, and a second device may include an exciter for providing stimuli.

Figure 13:
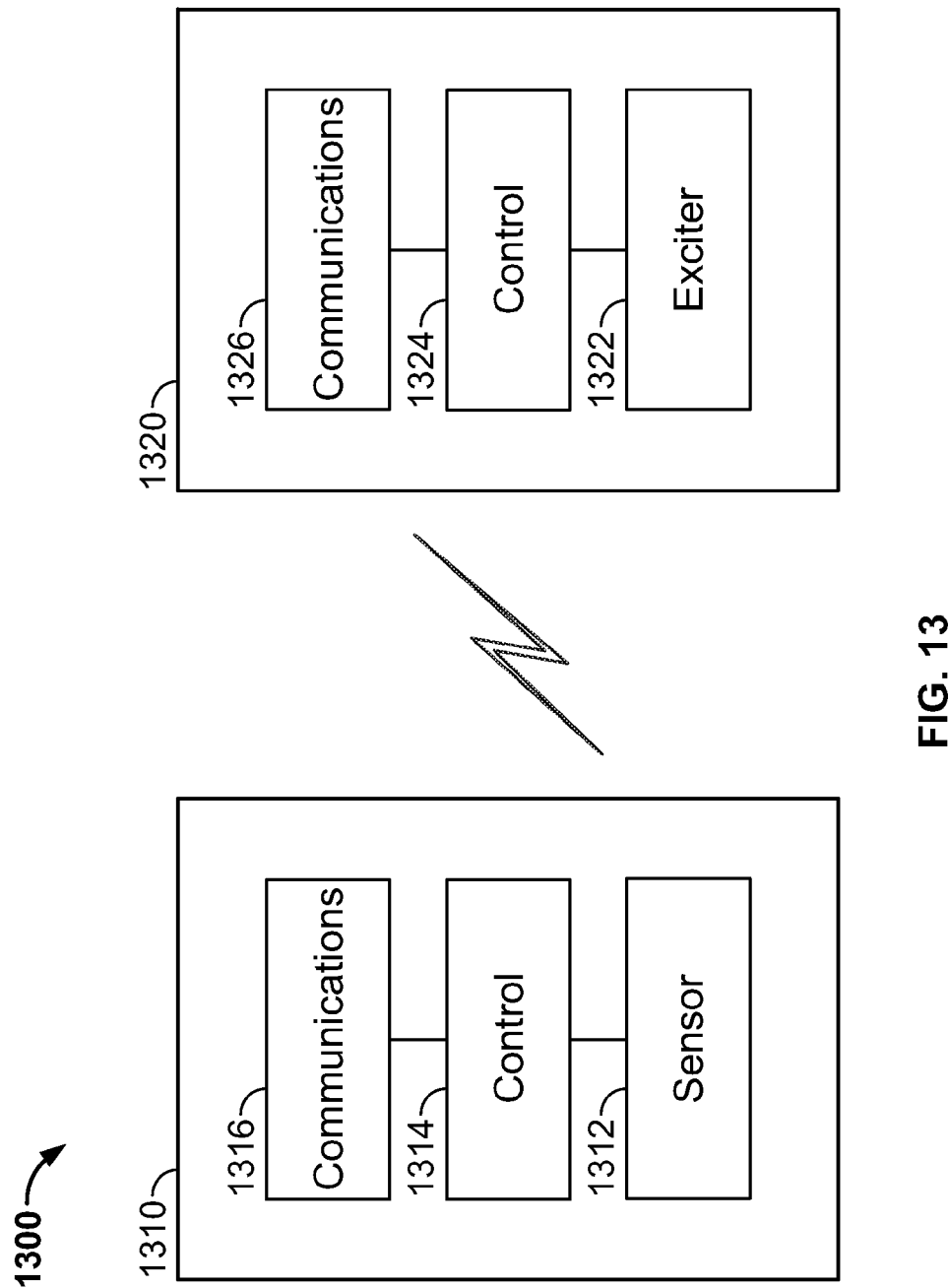
FIG. 13 is a schematic view of a communications system in accordance with one embodiment of the invention.

FIG. 13 can include communications system 1300 in accordance with one embodiment of the invention. System 1300 can include first communications device 1310 and second communications device 1320. First communications device 1310 and second communications device 1320 may each be any suitable device for sending and receiving wireless communications.

First communications device 1310 may be substantially similar to first communications device 110 of FIG. 1, and the previous description of the latter can be applied to the former. For example, first communications device 1310 may include sensor 1312 that corresponds to sensor 112, control circuitry 1314 that corresponds to control circuitry 114, and wireless communications circuitry 1316 that corresponds to wireless communications circuitry 116.

Second communications device 1320 may, with the exception of exciter 1322, be substantially similar to second communications device 120 of FIG. 1. For example, second communications device 1320 may include control circuitry 1324 that corresponds to control circuitry 124 and wireless communications circuitry 1326 that corresponds to wireless communications circuitry 126.

Second communications device 1320 also can include exciter 1322. Exciter 1322 may provide physical stimuli for generating an authentication key that can be used to form secure networks with other devices (e.g., first communications device 1310). For example, exciter 1322 may be a mechanism that creates vibrations, sensor 1312 may be an accelerometer that can detect the vibrations, and first communications device 1310 may be able to generate an authentication key based on a measured characteristic value of the vibrations.

Exciter 1322 can provide any suitable type or number of physical stimuli for detection by another device (e.g., first communications device 1310). For example, exciter 1322 may provide one or more movement stimuli (e.g., vibrations), light stimuli (e.g., a strobe), sound stimuli, any other emitted radiation stimuli, or any combination thereof. The type of stimuli provided by exciter 1322 may correspond to the type of stimuli that sensors in other devices (e.g., sensor 1312) can detect. The number of stimuli provided by exciter 1322 may vary depending on the characteristic value being measured by another device (e.g., first communications device 1310). For example, exciter 1322 may provide a single stimulus if the characteristic value being measured is based on a single excitation in sensor output. In another example, exciter 1322 may provide two or more stimuli if the characteristic value being measured is based on an elapsed time between excitations or an average value of an excitation property across multiple excitations (e.g., average excitation magnitude or average excitation duration).

In some embodiments, exciter 1322 can perform other functions during the operation of second communications device 1320. For example, exciter 1322 may include a vibrating mechanism that both notifies a user when a communications event (e.g., an incoming phone call) occurs and provides movement stimuli for generating authentication keys. In another example, exciter 1322 may include a display that both presents information to the device's user during normal operation and provides one or more light stimuli for generating authentication keys. In yet another example, exciter 1322 may include an audio output that both provides audio to the device's user during normal operation and provides one or more audio stimuli for generating authentication keys.

In some embodiments, first communications device 1310 may be positioned in a special manner for detecting the one or more stimuli generated by exciter 1322. For example, first communications device 1310 may be positioned so that sensor 1312 is adjacent to exciter 1322 when exciter 1322 is providing one or more stimuli. In embodiments where the one or more physical stimuli include movement, the devices may be held together to ensure that any movement of exciter 1322 is accurately detected by sensor 1312. In embodiments whether the one or more physical stimuli include other stimuli (e.g., light, sound, or other radiation), first communications device 1310 may be positioned so that sensor 1312 can detect any stimuli generated by exciter 1322.

In some embodiments, first communications device 1310 may be positioned to prevent snooping when detecting one or more physical stimuli. For example, if the one or more stimuli includes non-movement stimuli (e.g., light, sound, or other radiation), first communications device 1310 may be positioned so that nearby devices belonging to strangers cannot secretly detect the stimuli. For example, if the one or more stimuli includes light, first communications device 1310 may be positioned so that it blocks the light generated by exciter 1322 from nearby devices. This may be advantageous because it can prevent nearby devices from detecting the one or more stimuli, generating an authentication key, and then eavesdropping (e.g., snooping) on a secure network between the devices.

In some embodiments, the magnitude of the one or more stimuli generated by exciter 1322 may be limited to prevent snooping when generating authentication keys. For example, the magnitude of the one or more stimuli generated by exciter 1322 may be set below a predetermined value so that nearby devices belonging to strangers cannot detect the stimuli. This may be advantageous because it can prevent nearby devices from detecting the one or more stimuli, generating an authentication key, and then eavesdropping (e.g., snooping) on a secure network between the devices.

Figure 14:
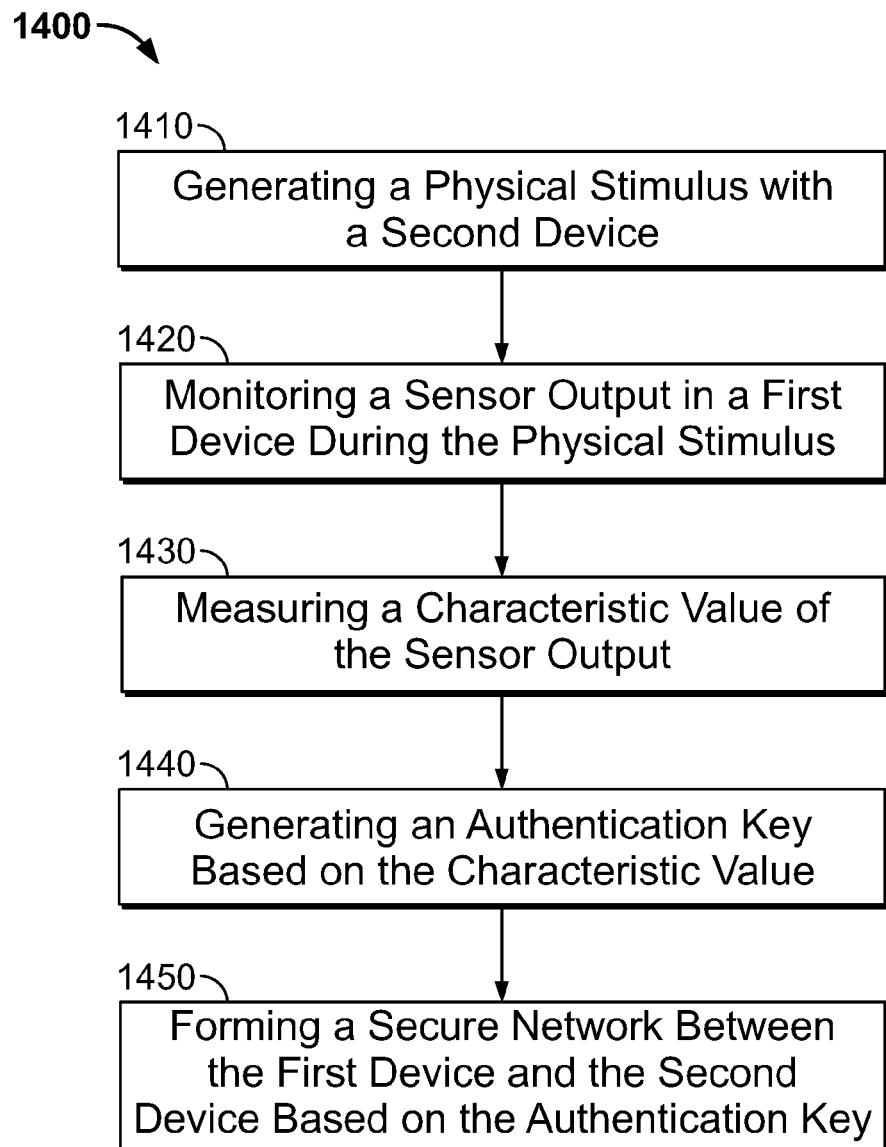
FIG. 14 is a flowchart of an illustrative process for authenticating a network in accordance with one embodiment of the invention.

FIG. 14 is a flow chart of an illustrative process for generating an authentication key in accordance with one embodiment of the invention. Process 1400 can be used by a first communications device (e.g., first communications device 1310 of FIG. 13) to generate an authentication key based on one or more common physical stimuli provided by a second communications device (e.g., second communications device 1320 of FIG. 13). In some embodiments, the authentication key can then be used to form a secure network between the first communications device 110 and the second communications device 120. Process 1400 may begin with step 1410.

At step 1410, a second device can generate a physical stimulus. The physical stimulus may be generated by an exciter in the second device (e.g., exciter 1322 in second communications device 1320). In some embodiments, the physical stimulus may be generated in response to receiving a user input (see, e.g., discussion related to FIGS. 6A-6C, 7, and 8). In such embodiments, the device may wait a predetermined amount of time after receiving a user input before the device provides the physical stimulus so that a user can position the device properly relative to another device (e.g., so that a user can align exciter 1322 with sensor 1312). In some embodiments, the device may instruct the device's user on how to position the device relative to another device that will detect the stimulus. For example, the device may provide instructions on a display screen for positioning the device relative to another device during step 1410.

At step 1420, a first communications device can monitor a sensor output during the physical stimulus. For example, sensor 1312 can detect the stimulus and generate a corresponding excitation in the sensor's output. The sensor output can be monitored by control circuitry (e.g., control circuitry 1314) or any other suitable circuitry in a communications device (e.g., first communications device 1310).

At step 1430, a characteristic value of the sensor output can be measured. For example, control circuitry 1314 can measure a characteristic value of the output of sensor 1312. The characteristic value can be based on any suitable property of the sensor output (see, e.g., discussion related to FIG. 2 or 3).

At step 1440, an authentication key can be generated based on the characteristic value measured at step 1430. For example, first communications device 1310 can generate an authentication key based on the measured characteristic value. In some embodiments, an authentication key can be generated by performing an algorithm that uses the characteristic value measured at step 1430 as a seed (see, e.g., discussion related to FIG. 2, 3, 9, or 10).

At step 1450, a secure network can be formed between the first device and the second device based on the authentication key generated at step 1440. For example, the first device can form a secure, peer-to-peer wireless network with the second device based on the authentication key.

The second device (e.g., second communications device 1320) can use an authentication key associated with the stimuli generated at step 1410 to form the secure network at step 1450. In some embodiments, the second device may independently generate an authentication key after step 1410 based on a measured characteristic value. For example, the second device may measure a characteristic value from the signal used to control an exciter at step 1410. In another example, the second device may include a sensor that can detect the stimulus generated at step 1410 and circuitry for measuring a characteristic value in the sensor's output. In some embodiments, the second device, having generated the physical stimulus at step 1410, may start with a predetermined authentication key and control an exciter to generate the stimulus based on the predetermined key. In such embodiments, the predetermined authentication key can then be used at step 1450 to form a secure network with the first device.

In some embodiments, the secure network formed at step 1450 may be in accordance with a Bluetooth® communications protocol. For example, the authentication key generated at step 1440 can be a PIN that is used to form a secure Bluetooth® network between the first device and the second device at step 1450.

The above described embodiments of the present invention are presented for purposes of illustration and not of limitation, and the present invention is limited only by the claims which follow.

What is claimed is:

1. A method for establishing a protected communication channel between a first device and a second device, the method comprising, at the first device:
in response to detecting a presence of the second device based on at least one wireless signal communicated between the first device and the second device:
displaying, within a graphical user interface (GUI) on a display of the first device, requirements of a stimulus needed to establish the protected communication channel with the second device;
detecting the stimulus;
accessing an encryption key that is based on the stimulus; and
establishing the protected communication channel with the second device using the encryption key.

2. The method of claim 1, wherein the stimulus comprises a characteristic value, and the encryption key is generated based on the characteristic value.

3. The method of claim 1, wherein the stimulus is detected by the first device using a sensor, and the stimulus is provided via an exciter of the second device.

4. The method of claim 1, wherein an exciter is configured to generate the stimulus comprising at least one of a vibration, light, and sound.

5. The method of claim 1, wherein the stimulus comprises a physical tap, and the method further comprises:
causing at least one first sensor on the first device to detect the physical tap made against the first device, and
correspondingly causing at least one second sensor on the second device to detect physical taps made against the second device.

6. The method of claim 1, further comprising displaying, on the GUI, an indicator of a progress of establishing the protected communication channel.

7. The method of claim 1, wherein the requirements describe:
a type of the stimulus required to establish the protected communication channel,
a number of times to provide the stimulus to establish the protected communication channel, or
some combination thereof.

8. A non-transitory computer readable storage medium configured to store instructions that, when executed by a processor included in a first device, cause the first device to establish a protected communication channel between the first device and a second device, by carrying out steps that include:
in response to detecting a presence of the second device based on at least one wireless signal communicated between the first device and the second device:
displaying, within a graphical user interface (GUI) on a display of the first device, requirements of a stimulus needed to establish the protected communication channel with the second device;
detecting the stimulus;
accessing an encryption key that is based on the stimulus; and
establishing the protected communication channel with the second device using the encryption key.

9. The non-transitory computer readable storage medium of claim 8, wherein the stimulus comprises a characteristic value, and the encryption key is generated based on the characteristic value.

10. The non-transitory computer readable storage medium of claim 8, wherein the stimulus is detected by the first device using a sensor, and the stimulus is provided via an exciter of the second device.

11. The non-transitory computer readable storage medium of claim 8, wherein an exciter is configured to generate the stimulus comprising at least one of a vibration, light, and sound.

12. The non-transitory computer readable storage medium of claim 8, wherein the stimulus comprises a physical tap, and the steps further include:
causing at least one first sensor on the first device to detect the physical tap made against the first device, and
correspondingly causing at least one second sensor on the second device to detect physical taps made against the second device.

13. The non-transitory computer readable storage medium of claim 8, wherein the steps further include displaying, on the GUI, an indicator of a progress of establishing the protected communication channel.

14. The non-transitory computer readable storage medium of claim 8, wherein the requirements describe:
a type of the stimulus required to establish the protected communication channel,
a number of times to provide the stimulus to establish the protected communication channel, or
some combination thereof.

15. A first device configured to establish a protected communication channel with a second device, the first device comprising:
at least one processor; and
at least one memory storing instructions that, when executed by the at least one processor, cause the first device to carry out steps that include:
in response to detecting a presence of the second device based on at least one wireless signal communicated between the first device and the second device:
displaying, within a graphical user interface (GUI) on a display of the first device, requirements of a stimulus needed to establish the protected communication channel with the second device;
detecting the stimulus;
accessing an encryption key that is based on the stimulus; and establishing the protected communication channel with the second device using the encryption key.

16. The first device of claim 15, wherein the stimulus comprises a characteristic value, and the encryption key is generated based on the characteristic value.

17. The first device of claim 15, wherein the stimulus is detected by the first device using a sensor, and the stimulus is provided via an exciter of the second device.

18. The first device of claim 15, wherein an exciter is configured to generate the stimulus comprising at least one of a vibration, light, and sound.

19. The first device of claim 15, wherein the stimulus comprises a physical tap, and the steps further include:
   causing at least one first sensor on the first device to detect the physical tap made against the first device, and correspondingly causing at least one second sensor on the second device to detect physical taps made against the second device.

20. The first device of claim 15, wherein the steps further include displaying, on the GUI, an indicator of a progress of establishing the protected communication channel.

* * * * *